US009911191B2

United States Patent
Ikoma et al.

(10) Patent No.: US 9,911,191 B2
(45) Date of Patent: Mar. 6, 2018

(54) STATE ESTIMATION APPARATUS, STATE ESTIMATION METHOD, AND INTEGRATED CIRCUIT WITH CALCULATION OF LIKELIHOOD DATA AND ESTIMATION OF POSTERIOR PROBABILITY DISTRIBUTION DATA

(71) Applicants: MegaChips Corporation, Osaka-shi (JP); Kyushu Institute of Technology, Kitakyushu-shi (JP)

(72) Inventors: Norikazu Ikoma, Fukuoka (JP); Hiromu Hasegawa, Osaka (JP)

(73) Assignees: MegaChips Corporation, Osaka-shi (JP); KYUSHU INSTITUTE OF TECHNOLOGY, Kitakyushu-shi (JP)

( * ) Notice: Subject to any disclaimer, the term of this patent is extended or adjusted under 35 U.S.C. 154(b) by 0 days.

(21) Appl. No.: 14/881,652

(22) Filed: Oct. 13, 2015

(65) Prior Publication Data
US 2016/0035098 A1 Feb. 4, 2016

Related U.S. Application Data

(63) Continuation of application No. PCT/JP2014/055571, filed on Mar. 5, 2014.

(30) Foreign Application Priority Data

Apr. 15, 2013 (JP) .................................. 2013-085014

(51) Int. Cl.
G06T 7/77 (2017.01)
G06T 7/73 (2017.01)
(Continued)

(52) U.S. Cl.
CPC ........ *G06T 7/0048* (2013.01); *G06K 9/00771* (2013.01); *G06K 9/4609* (2013.01);
(Continued)

(58) Field of Classification Search
CPC ....... G06T 7/0048; G06T 7/0042; G06T 7/20; G06T 2207/10016; G06T 2007/20024;
(Continued)

(56) References Cited

U.S. PATENT DOCUMENTS

| 2008/0063236 | A1 | 3/2008 | Ikenoue et al. |
| 2009/0213222 | A1* | 8/2009 | Baba ....................... G06T 7/277 348/169 |

(Continued)

FOREIGN PATENT DOCUMENTS

| CN | 101975575 A | 2/2011 |
| CN | 101975575 B | 2/2011 |

(Continued)

OTHER PUBLICATIONS

International Search Report dated May 13, 2014 for PCT/JP2014/055571 filed on Mar. 5, 2014 with English Translation.

(Continued)

*Primary Examiner* — Bhavesh Mehta
*Assistant Examiner* — Menatoallah Youssef
(74) *Attorney, Agent, or Firm* — Oblon, McClelland, Maier & Neustadt, L.L.P.

(57) ABSTRACT

The purpose of the present invention is to provide a state estimation apparatus that appropriately estimates the internal state of an observation target by determining likelihoods from a plurality of observations. An observation obtaining unit of the state estimation system obtains, at given time intervals, a plurality of observation data obtained from an observable event. The observation selecting unit selects a piece of observation data from the plurality of pieces of observation data obtained by the observation obtaining unit based on a posterior probability distribution data obtained at a preceding time t−1. The likelihood obtaining unit obtains likelihood data based on the observation data selected by the (Continued)

observation selecting unit and predicted probability distribution data obtained through prediction processing using the posterior probability distribution data. The posterior probability distribution estimation unit estimates posterior probability distribution data representing a state of the observable event based on the predicted probability distribution data obtained by the likelihood obtaining unit and the likelihood data. The prior probability distribution output unit outputs prior probability distribution data based on the posterior probability distribution data estimated by the posterior probability distribution estimation unit as prior probability distribution data at a next time t+1.

11 Claims, 12 Drawing Sheets

(51) Int. Cl.
    *G06K 9/46*     (2006.01)
    *G06T 7/20*     (2017.01)
    *G06K 9/32*     (2006.01)
    *G06T 7/00*     (2017.01)
    *G06K 9/00*     (2006.01)

(52) U.S. Cl.
    CPC .............. *G06K 9/4652* (2013.01); *G06T 7/20* (2013.01); *G06T 7/73* (2017.01); *G06T 7/77* (2017.01); *G06K 2009/3291* (2013.01); *G06T 2207/10016* (2013.01); *G06T 2207/20024* (2013.01); *G06T 2207/20076* (2013.01)

(58) Field of Classification Search
    CPC ........... G06T 2207/20076; G06T 7/208; G06T 7/2006; G06K 9/00771; G06K 9/4652; G06K 9/4609; G06K 2009/3291
    See application file for complete search history.

(56) References Cited

U.S. PATENT DOCUMENTS

2010/0002908 A1\*   1/2010   Miyamoto ................ B60R 1/00
                                                                         382/103
2010/0174475 A1     7/2010   Estkowski et al.

FOREIGN PATENT DOCUMENTS

| JP | 2007-328746 A | 12/2007 |
|---|---|---|
| JP | 2009-199363 A | 9/2009 |
| JP | 2012-234466 A | 11/2012 |
| WO | WO 2006/105094 A2 | 10/2006 |

OTHER PUBLICATIONS

International Written Opinion dated May 13, 2014 for PCT/JP2014/055571 filed on Mar. 5, 2014.
European Office Action dated Jun. 20, 2016 in European Patent Application No. 14785984.7.
European Search Report dated May 12, 2016 in Patent Application No. 14785984.7.
Ivan Laptev, et al., "• Tracking of Multi-state Hand Models Using Particle Filtering and a Hierarchy of Multi-scale Image Features" Scale-Space and Morphology in Computer Vision, XP55268022, Jan. 1, 2001, pp. 63-74.
Qi Hao, et al., "Tracking and Identifying Multiple Humans with Wireless Geometric Pyroelectric Sensors" IEEE Transactions on System, Man, and Cybernetics, Part A, XP55268323, Jan. 1, 2006, pp. 1-16.
European Office Action dated May 24, 2017 in European Patent Application No. 14 785 984.7. (5 pages).
Decision to Grant a Patent in Japanese Application No. 2013-085014, dated May 24, 2017, with English translation. (6 pages).

\* cited by examiner

STATE ESTIMATION APPARATUS, STATE ESTIMATION METHOD, AND INTEGRATED CIRCUIT WITH CALCULATION OF LIKELIHOOD DATA AND ESTIMATION OF POSTERIOR PROBABILITY DISTRIBUTION DATA

TECHNICAL FIELD

The present invention relates to a technique for estimating the state of an observable event using time-series filtering, and particularly to, for example, a technique for tracking objects in moving images using time-series filtering.

BACKGROUND ART

Techniques for estimating the internal state of an observation target, changing from moment to moment, may use time-series filtering. With a state vector $x_t$ indicating the internal state of an object at time t and an observation vector $y_t$ indicating a feature observed at time t, time-series filtering enables an internal state $x_t$ of a directly unobservable object to be estimated by using the observation vector $y_t$ obtained through observation.

More specifically, time-series filtering is a technique for determining a conditional probability distribution $p(x_t|y_{1:t})$ of a state series $x_{0:t} = \{x_0, x_1, \ldots, x_t\}$ using the state space models below, when an observation series (a set of observation vectors up to time t) $y_{1:t} = \{y_1, y_2, \ldots, y_t\}$ is given.

System model: $x_t \sim f(x_t|x_{t-1})$
Observation model: $y_t \sim h(y_t|x_t)$ With a system noise $v_t$ and an observation noise $w_t$, the system model showing the internal state of an object and the observation model in observing the object can be expressed as follows.

The system model showing the internal state of an object: $x_t = f(x_{t-1}, v_t)$ The observation model in observing the object: $y_t = h(x_t, w_t)$ where $f(x_{t-1}, v_t)$ is a state transition function indicating a change in the states between time t−1 and time t, and $h(x_t, w_t)$ is a function representing an observation vector obtained in the state $x_t$.

In this case, the one-step-ahead prediction is written as the formula below.

$$p(x_t|y_{1:t-1}) = \int p(x_{t-1}|y_{1:t-1}) f(x_t|x_{t-1}) dx_{t-1} \quad \text{Formula 1}$$

Based on Bayes' theorem, the posterior probability distribution $p(x_t|y_{1:t})$ at time t is written as the formula below.

$$p(x_t|y_{1:t}) = \frac{h(y_t|x_t)p(x_t|y_{1:t-1})}{p(y_t|y_{1:t-1})} \quad \text{Formula 2}$$

In this formula, $h(y_t|x_t)$ is a likelihood (a probability for obtaining an observation vector $y_t$ in the state $x_t$), and $p(x_t|y_{1:t-1})$ is a prior probability distribution.

One practical example of time-series filtering is particle filtering. Particle filters represent the distribution of probabilities of the internal state of an observation target as the distribution of particles, and use the distribution of posterior probabilities of the state at the current time step as the distribution of prior probabilities of the state at the next time step. With particle filtering, the likelihood is calculated by comparing a template observation estimated from the state of particles indicating the distribution of prior probabilities (a set of samples generated in accordance with the prior probability distribution) (predictive samples) with an actual image (an actual observation) obtained at the next time step.

Particle filtering estimates the posterior probability distribution of particles from the calculated likelihoods and the prior probability distribution.

Particle filtering uses the above processing performed repeatedly at each subsequent time step to successively estimate the dynamically changing state of an observation target (e.g., a tracking target).

Particle filtering involves the processing (1) to (4) below, in which M is the number of particles (M is a natural number) and $1 \le i \le M$ (i is an integer).

(1) Generating Particles (One-Step-Ahead Prediction)

For each sample (each particle), the processing corresponding to the formula below is performed to generate a predictive sample at time t.

More specifically, the probability distribution predicted in accordance with the system model (state transition function) is obtained from the posterior probability distribution at time t−1 (the probability distribution of the internal state of an observation target at time t−1). In more detail, each predictive sample is generated from the corresponding sample (particle) at time t−1 through transition in accordance with the system model f.

$$xa_{t(i)} \sim f(x_t|x_{t-1}^{(i)})$$

$$xa_t = \{xa_t^{(1)}, xa_t^{(2)}, xa_t^{(3)}, \ldots, xa_t^{(M)}\}$$

where $xa_t$ is a predictive (estimated) vector of a state vector $x_t$ calculated by a state transition function $f(\ )$.

(2) Calculating Weights (Calculating Likelihoods)

For each predictive sample generated in processing (1), the processing corresponding to the formula below is performed to calculate a weight (likelihood). More specifically, the probability (likelihood) to obtain the observation vector yt is estimated in accordance with the observation model h.

$$wa_t^{(i)} \sim h(y_t|xa_t^{(i)})$$

$$wa_t = \{wa_t^{(1)}, wa_t^{(2)}, wa_t^{(3)}, \ldots, wa_t^{(M)}\}$$

where $wa_t$ is a predictive (estimated) vector of a weight (likelihood) $w_t$ (a set of predictive likelihoods) calculated by a function $h(\ )$.

(3) Resampling

At the ratio proportional to the weight (likelihood) $wa_t^{(i)}$, M particles are sampled without changing the total number of the particles (the particle $xa_t^{(i)}$ is sampled). The posterior probability distribution at time t (the probability distribution of the internal state of the observation target at time t) is obtained from the sampled M particles.

(4) The time t is incremented by one step, and the processing returns to (1). The posterior probability distribution obtained in processing (3) (the posterior probability distribution at time t) is used as the prior probability distribution at the next time step (time t+1).

As described above, particle filtering estimates parameters indicating the changing state of the observation target, changing from moment to moment, by repeatedly predicting the prior probability distribution of parameters indicating the state of the observation target and calculating the posterior probability distribution. Such particle filtering may be used in tracking the position of an object in moving images. In tracking the position of an object with particle filtering, parameters indicating the position of an object may include parameters indicating the state of a tracking target (an example of an observation target). Particle filtering includes comparing observations estimated from parameters indicating the position of the object (predictive samples) with actual observations (e.g., an image captured by a camera) to calculate likelihoods, and resampling particles based on the calculated likelihoods to obtain the posterior probability distribution of parameters indicating the state of the observation target (see, for example, Patent Literature 1: Japanese Unexamined Patent Publication No 2012-234466).

In the case of performing a process for tracking an object using particle filtering, assuming that the actual observation is an image (moving image), it is needed that the likelihood is calculated with extracting the image feature quantity for the object to be tracked. This increases calculation amount in calculating the likelihood.

In view of this, it is conceivable to determine the feature of an object to be tracked, obtain an image-feature-quantity detected image by obtaining the feature of the object, and then calculate the likelihood using the obtained image-feature-quantity detected image. For example, in a case when the feature of an object to be tracked is set to be a yellow object with a size of W×H (W: Width, H: height), an image-feature-quantity detected image, in which a pixel value of a pixel is larger as the degree of being yellow in an image area that includes the pixel and has a size of W×H (W: Width, H: height) is higher, is obtained. Then, calculating the likelihood using the image-feature-quantity detected image decreases computation amount in calculating the likelihood. This achieves processing with particle filtering (e.g., processing for tracking an object) that appropriately estimates the internal state of an observation target while preventing computation amount from increasing.

DISCLOSURE OF INVENTION

Technical Problem

However, the above-described particle filtering performs calculation to obtain posterior probability distribution using the likelihood obtained through a single observation, and thus may not appropriately estimate the internal state of the observation target in some situations. For example, in tracking an object or objects in moving images, the above-described particle filtering uses the likelihood obtained through a single observation, thus making it difficult for the particle filtering to appropriately track an object whose size varies or a plurality of objects with different sizes.

To solve the above problems, it is an object of the present invention to provide a state estimation apparatus, a program, and an integrated circuit each of which appropriately estimates the internal state of an observation target by obtaining likelihoods through multiple observations, and, for example, accurately tracks an object whose size varies or a plurality of objects with different sizes in moving images.

Solution to Problem

To solve the above problems, a first aspect of the invention provides a state estimation apparatus including an observation obtaining unit, observation selecting unit, likelihood obtaining unit, a posterior probability distribution estimation unit, and a prior probability distribution output unit.

The observation obtaining unit obtains, at predetermined time intervals, a plurality of pieces of observation data obtained from an observable event.

The observation selecting unit selects a piece of observation data from the plurality of pieces of observation data obtained by the observation obtaining unit based on a posterior probability distribution data obtained at a preceding time t−1.

The likelihood obtaining unit obtains likelihood data based on the one piece of observation data selected by the observation selecting unit and predicted probability distribution data obtained by performing prediction processing using the posterior probability distribution data.

The posterior probability distribution estimation unit estimates posterior probability distribution data representing a state of the observable event based on the predicted probability distribution data obtained by the likelihood obtaining unit and the likelihood data.

The prior probability distribution output unit outputs prior probability distribution data based on the posterior probability distribution data estimated by the posterior probability distribution estimation unit as prior probability distribution data at a next time t+1.

In this state estimation apparatus, the observation obtaining unit obtains the plurality of observations (observation data), and the observation selecting unit selects more appropriate observation data in accordance with the internal state of an observation target (e.g., a tracking target). In this state estimation apparatus, the likelihood data is calculated based on the selected observation data, and then posterior probability distribution data is obtained using the calculated likelihood data.

Thus, the state estimation apparatus can obtain appropriate posterior probability distribution data even when the state of the observation target (e.g., tracking target) changes. As a result, the state estimation apparatus can appropriately estimate the internal state of the observation target, and thus accurately tracks, for example, an object whose size varies or a plurality of objects with different sizes in moving images.

It should be noted that the term "time" includes time defined by intervals at which an observation target is sampled; for example, time t−1 represents a timing one-sampling-time previous to a timing of sampling at time t.

Furthermore, "observation data" may be data obtained by extracting (detecting) a predetermined feature quantity representing characteristic(s) of an observation target.

A second aspect of the invention provides a state estimation apparatus including an observation obtaining unit, a likelihood calculation unit, a likelihood obtaining unit, a posterior probability distribution estimation unit, and a prior probability distribution output unit.

The observation obtaining unit obtains, at predetermined time intervals, a plurality of pieces of observation data obtained from an observable event.

The likelihood calculation unit calculates likelihood data for each of the plurality of pieces of observation data obtained by the observation obtaining unit based on the predicted probability distribution data obtained by performing prediction processing using the posterior probability distribution data obtained at the preceding time t−1.

The likelihood obtaining unit derives a piece of likelihood data based on the plurality of pieces of likelihood data calculated, for each of the plurality of pieces of observation data, by the likelihood calculation unit and obtains the derived likelihood data as determined likelihood data.

The posterior probability distribution estimation unit estimates posterior probability distribution data representing a state of the observable event based on the predicted probability distribution data and the determined likelihood data.

The prior probability distribution output unit outputs prior probability distribution data based on the posterior probability distribution data estimated by the posterior probability distribution estimation unit as prior probability distribution data at a next time t+1.

In this state estimation apparatus, the observation obtaining unit obtains a plurality of observations (observation data), and the likelihood calculation unit calculates a piece of likelihood data for each of the plurality of observations. This state estimation apparatus then derives more appropriate likelihood data from a plurality of pieces of likelihood data calculated by the likelihood calculation unit in accordance with the state of an observation target (e.g., a tracking target). This state estimation apparatus then obtains posterior probability distribution data using the derived likelihood data. Thus, the state estimation apparatus can obtain appropriate posterior probability distribution data even when the state of the observation target (e.g., tracking target) changes. As a result, the state estimation apparatus can appropriately estimate the internal state of the observation target, and thus accurately tracks, for example, an object whose size varies or a plurality of objects with different sizes in moving images.

A third aspect of the invention provides the state estimation apparatus of the second aspect of the invention in which the likelihood obtaining unit obtains a piece of likelihood data selected from the plurality of pieces of likelihood data as the determined likelihood data.

Thus, this state estimation apparatus can obtain posterior probability distribution data using a piece of likelihood data selected from the plurality of pieces of likelihood data.

A fourth aspect of the invention provides the state estimation apparatus of the second aspect of the invention in which the likelihood obtaining unit obtains a piece of likelihood data derived by adding, with weighting, the plurality of pieces of likelihood data as the determined likelihood data, This state estimation apparatus obtains posterior probability distribution data using likelihood data derived by adding, with weighting, the plurality of pieces of likelihood data. Thus, the state estimation apparatus can obtain appropriate posterior probability distribution data even when the state of the observation target (e.g., tracking target) abruptly changes. In other words, when the state of the object to be tracked changes abruptly, performing a process with selecting one from a plurality of observations causes posterior distribution data that is to be obtained to change abruptly in switching the selected observation, thereby resulting in an unnatural state estimation process (e.g., tracking process). In contrast, this state estimation system performs a process with the synthesized likelihood obtained by adding, with weighting, a plurality of pieces of likelihood data, and thus appropriately prevents posterior distribution data that is to be obtained from changing abruptly even when the observation target abruptly changes. As a result, this state estimation apparatus achieves a natural state estimation process (e.g., a natural tracking process).

A fifth aspect of the invention provides the state estimation apparatus of the fourth aspect of the invention in which the likelihood calculation unit, the likelihood obtaining unit, the posterior probability distribution estimation unit, and the prior probability distribution output unit perform processing using a particle filter.

The weighted coefficient of the likelihood data is represented using a function of particles representing an internal state.

Thus, the likelihood data is obtained by using the weighted coefficients obtained by the function of particles representing the internal state.

A sixth aspect of the invention provides the state estimation apparatus of one of the second to fifth aspects of the invention in which the likelihood calculation unit, the likelihood obtaining unit, the posterior probability distribution estimation unit, and the prior probability distribution output unit perform processing using a particle filter.

This achieves a state estimation apparatus that performs processing through the particle filter.

A seventh aspect of the invention provides the state estimation apparatus of the first aspect of the invention in which the observation selecting unit, the likelihood obtaining unit, the posterior probability distribution estimation unit, and the prior probability distribution output unit perform processing using a particle filter.

This achieves a state estimation apparatus that performs processing through the particle filter.

An eighth aspect of the invention provides a state estimation method including an observation obtaining step, an observation selecting step, a likelihood obtaining step, a posterior probability distribution estimation step, and a prior probability distribution output step.

The observation obtaining step obtains, at predetermined time intervals, a plurality of pieces of observation data obtained from an observable event.

The observation selecting step selects a piece of observation data from the plurality of pieces of observation data obtained by the observation obtaining step based on a posterior probability distribution data obtained at a preceding time t−1.

The likelihood obtaining step obtains likelihood data based on the one piece of observation data selected by the observation selecting step and predicted probability distribution data obtained by performing prediction processing using the posterior probability distribution data.

The posterior probability distribution estimation step estimates posterior probability distribution data representing a state of the observable event based on the predicted probability distribution data obtained by the likelihood obtaining step and the likelihood data.

The prior probability distribution output step outputs prior probability distribution data based on the posterior probability distribution data estimated by the posterior probability distribution estimation step as prior probability distribution data at a next time t+1.

This achieves the state estimation method having the same advantageous effects as the state estimation apparatus of the first aspect of the present invention.

A ninth aspect of the invention provides a state estimation method including an observation obtaining step, a likelihood calculation step, a likelihood obtaining step, a posterior probability distribution estimation step, and a prior probability distribution output step.

The observation obtaining step obtains, at predetermined time intervals, a plurality of pieces of observation data obtained from an observable event.

The likelihood calculation step calculates likelihood data for each of the plurality of pieces of observation data obtained by the observation obtaining step based on the predicted probability distribution data obtained by performing prediction processing using the posterior probability distribution data obtained at the preceding time t−1.

The likelihood obtaining step derives a piece of likelihood data based on the plurality of pieces of likelihood data calculated, for each of the plurality of pieces of observation data, by the likelihood calculation step and obtains the derived likelihood data as determined likelihood data.

The posterior probability distribution estimation step estimates posterior probability distribution data representing a state of the observable event based on the predicted probability distribution data and the determined likelihood data.

The prior probability distribution output step outputs prior probability distribution data based on the posterior probability distribution data estimated by the posterior probability distribution estimation step as prior probability distribution data at a next time t+1.

This achieves the state estimation method having the same advantageous effects as the state estimation apparatus of the second aspect of the present invention.

A tenth aspect of the invention provides an integrated circuit used in a state estimation apparatus including an observation obtaining unit configured to obtain, at predetermined time intervals, a plurality of pieces of observation data obtained from an observable event. The integrated circuit including an observation selecting unit, a likelihood obtaining unit, a posterior probability distribution estimation unit, and a prior probability distribution output unit.

The observation selecting unit selects a piece of observation data from the plurality of pieces of observation data obtained by the observation obtaining unit based on a posterior probability distribution data obtained at a preceding time t−1.

The likelihood obtaining unit obtains likelihood date based on the one piece of observation data selected by the observation selecting unit and predicted probability distribution data obtained by performing prediction processing using the posterior probability distribution data.

The posterior probability distribution estimation unit estimates posterior probability distribution data representing a state of the observable event based on the predicted probability distribution data obtained by the likelihood obtaining unit and the likelihood data.

The prior probability distribution output unit outputs prior probability distribution data based on the posterior probability distribution data estimated by the posterior probability distribution estimation unit as prior probability distribution data at a next time t+1.

This achieves the integrated circuit having the same advantageous effects as the state estimation apparatus of the first aspect of the present invention.

An eleventh aspect of the invention provides an integrated circuit used in a state estimation apparatus comprising an observation obtaining unit configured to obtain, at predetermined time intervals, a plurality of pieces of observation data obtained from an observable event. The integrated circuit including a likelihood calculation unit, a likelihood obtaining unit, a posterior probability distribution estimation unit, and a prior probability distribution output unit.

The likelihood calculation unit calculates likelihood data for each of the plurality of pieces of observation data obtained by the observation obtaining unit based on the predicted probability distribution data obtained by performing prediction processing using the posterior probability distribution data obtained at the preceding time t−1.

The likelihood obtaining unit derives a piece of likelihood data based on the plurality of pieces of likelihood data calculated, for each of the plurality of pieces of observation data, by the likelihood calculation unit and obtains the derived likelihood data as determined likelihood data.

The posterior probability distribution estimation unit estimates posterior probability distribution data representing a state of the observable event based on the predicted probability distribution data and the determined likelihood data.

The prior probability distribution output unit outputs prior probability distribution data based on the posterior probability distribution data estimated by the posterior probability distribution estimation unit as prior probability distribution data at a next time t+1.

This achieves the integrated circuit having the same advantageous effects as the state estimation apparatus of the second aspect of the present invention.

Advantageous Effects

The present invention provides a state estimation apparatus, a program, and an integrated circuit each of which appropriately estimates the internal state of an observation target by obtaining likelihoods through multiple observations, and, for example, accurately tracks an object whose size varies or a plurality of objects with different sizes in moving images.

DESCRIPTION OF THE PREFERRED EMBODIMENTS

First Embodiment

A first embodiment will now be described with reference to the drawings.

1.1 Structure of State Estimation System

Figure 1:
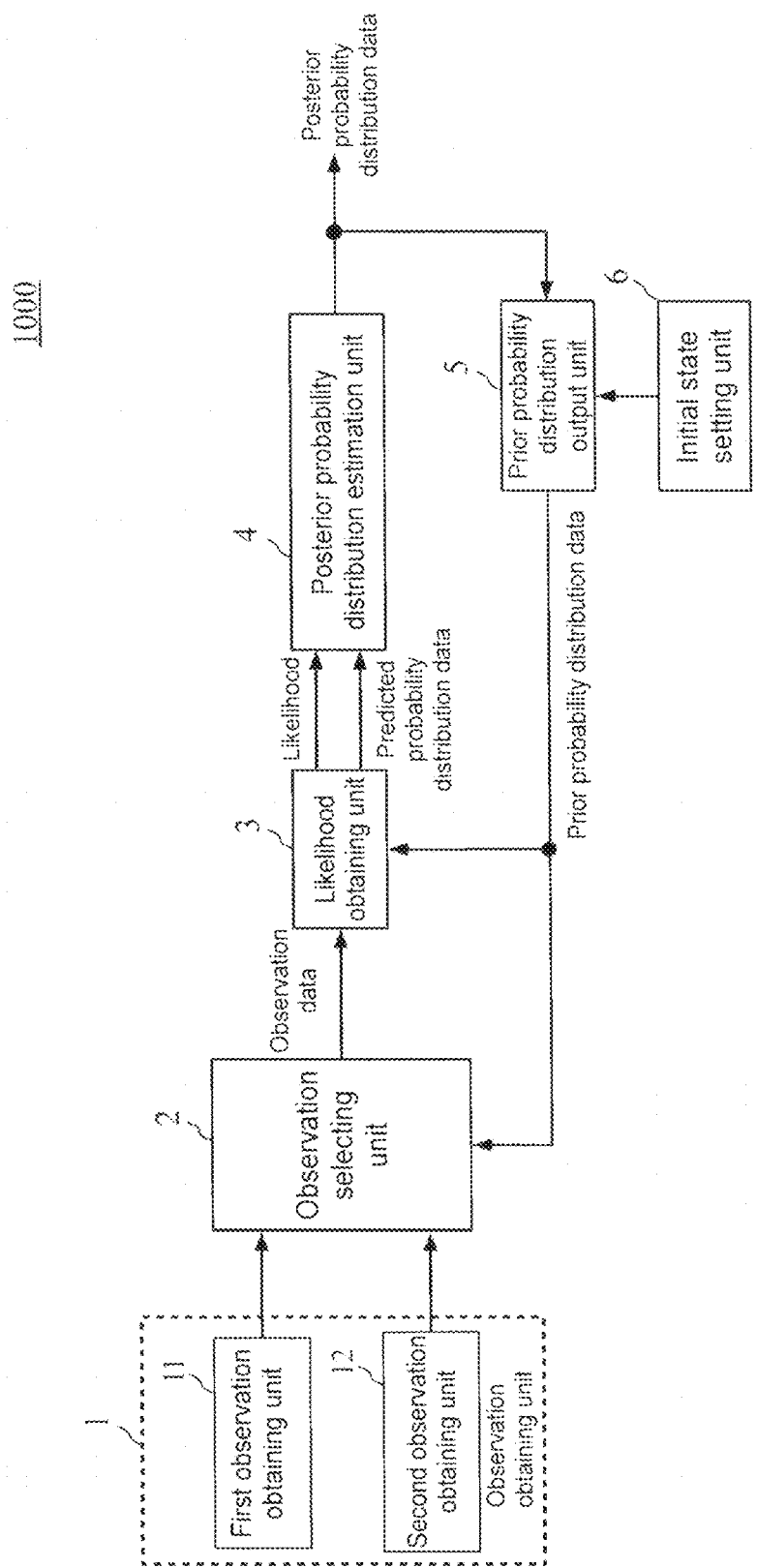
FIG. 1 is a schematic block diagram of a state estimation system 1000 according to a first embodiment.

FIG. 1 is a schematic block diagram of a state estimation system 1000 according to a first embodiment.

As shown in FIG. 1, the state estimation system 1000 includes an observation obtaining unit 1, an observation selecting unit 2, a likelihood obtaining unit 3, a posterior probability distribution estimation unit 4, a prior probability distribution output unit 5, and an initial state setting unit 6.

The observation obtaining unit 1 obtains a plurality of observations (multiple pieces of observation data), and transmits the obtained observations (multiple pieces of observation data) to the observation selecting unit 2. As shown in FIG. 1, the observation obtaining unit 1 includes a first observation obtaining unit 11 and a second observation obtaining unit 12.

Figure 2:
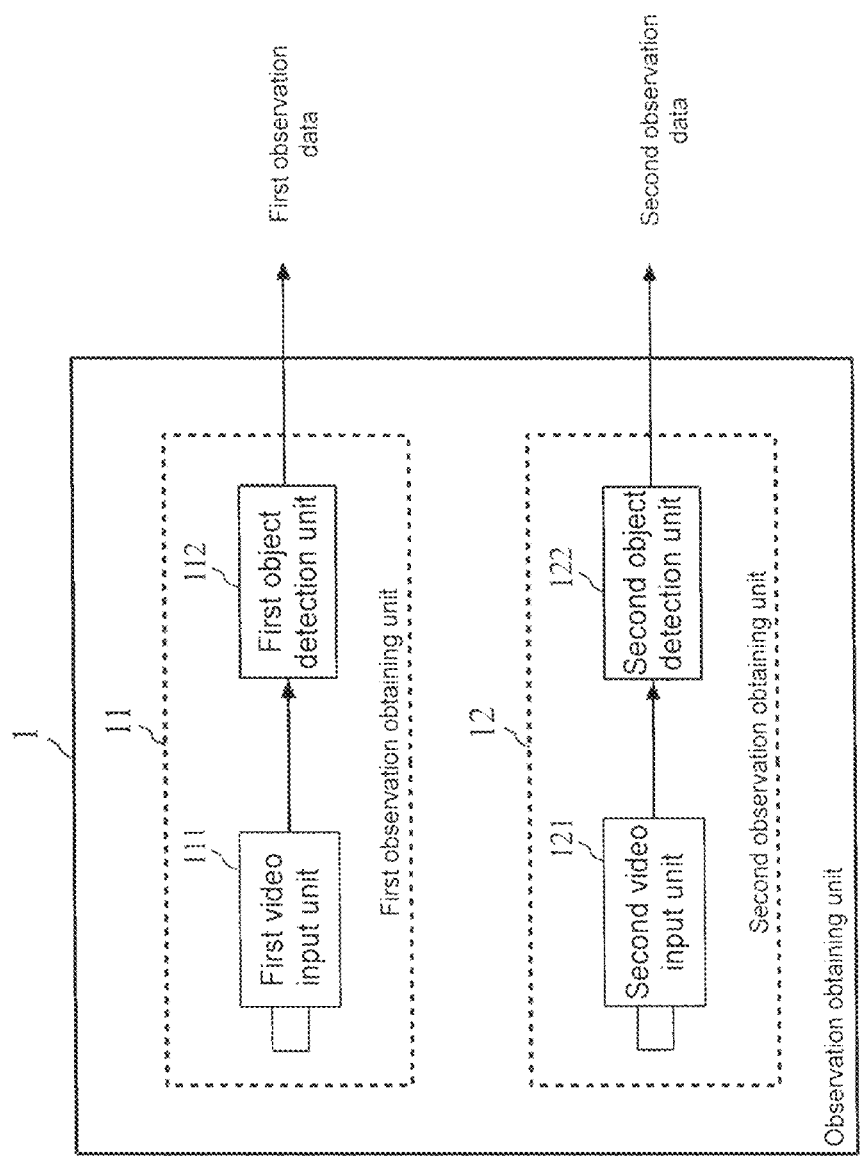
FIG. 2 is a schematic block diagram of an observation obtaining unit 1 according to the first embodiment.

The first observation obtaining unit 11 obtains a first observation (first observation data), and transmits the obtained first observation (observation data) to the observation selecting unit 2. As shown in FIG. 2, the first observation obtaining unit 11 includes, for example, a first video input unit 111 and a first object detection unit 112.

The first video input unit 111 obtains a video signal (moving image signal), for example, by capturing an image of a subject. The first video input unit 111 then transmits the obtained video signal (moving image signal) to the first object detection unit 112.

The first object detection unit 112 receives the video signal (moving image signal) transmitted from the first video input unit 111. The first object detection unit 112 obtains an object detection image from the received image (image that forms moving images).

When performing a process for tracking an object, the first object detection unit 112 obtains an object detection image (object detection image signal) in which image feature quantity for the object to be tracked is extracted (detected), and then transmits the obtained object detection image (object detection image signal) to the observation selecting unit 2 as a first observation (first observation data).

The second observation obtaining unit 12 obtains a second observation (second observation data), and transmits the obtained second observation (second observation data) to the observation selecting unit 2. As shown in FIG. 2, the second observation obtaining unit 12 includes, for example, a second video input unit 121 and a second object detection unit 122.

The second video input unit 121, for example, obtains a video signal (moving image signal) by capturing an image of a subject. The second video input unit 121 then transmits the obtained video signal (moving image signal) to the second object detection unit 122.

The second object detection unit 122 receives the video signal (moving image signal) transmitted from the second video input unit 121. The second object detection unit 122 obtains an object detection image from the received image (image that forms moving images).

When performing a process for tracking an object, the second object detection unit 122 obtains an object detection image (object detection image signal) in which image feature quantity for the object to be tracked is extracted (detected), and then transmits the obtained object detection image (object detection image signal) to the observation selecting unit 2 as a second observation (second observation data).

In the present embodiment, for ease of explanation, a case in which the observation obtaining unit 1 includes two observation obtaining units (the first observation obtaining unit 11 and the second observation obtaining unit 12) will be described. However, the number of the observation obtaining units that the observation obtaining unit 1 includes is not limited to two, and may be three or more. When the observation obtaining unit 1 includes N observation obtaining units (N is a natural number), the observation obtaining unit 1 transmits N observations (N pieces of observation data) to the observation selecting unit 2.

The observation selecting unit 2 receives the plurality of observation (observation data) transmitted from the observation obtaining unit 1 and prior probability distribution (prior probability distribution data) transmitted from the prior probability distribution output unit 5. The observation selecting unit 2 selects one observation from the plurality of observations (observed data) based on the prior probability distribution (prior probability distribution data), and then transmits the selected observation (observation data) to the likelihood obtaining unit 3.

The likelihood obtaining unit 3 receives the observation (observation data) transmitted from the observation selecting unit 2 and the prior probability distribution (prior probability distribution data) transmitted from the prior probability distribution output unit 5. The likelihood obtaining unit 3 performs prediction processing for the prior probability distribution (prior probability distribution data) to obtain predicted probability distribution (predicted probability distribution data). The likelihood obtaining unit 3 then calculates likelihoods based on the observation (observation data) and the predicted probability distribution (predicted probability distribution data). The likelihood obtaining unit 3 transmits the calculated likelihoods and the predicted probability distribution (predicted probability distribution data) to the posterior probability distribution estimation unit 4.

The posterior probability distribution estimation unit 4 receives the likelihoods (likelihood data) and the predicted probability distribution (predicted probability distribution data) transmitted from the likelihood obtaining unit 3. The posterior probability distribution estimation unit 4 estimates (obtains) posterior probability distribution (posterior probability distribution data) based on the likelihood (likelihood data) and the predicted probability distribution (predictive probability distribution data). The posterior probability distribution estimation unit 4 then transmits the obtained posterior probability distribution (posterior probability distribution data) to the prior probability distribution output unit 5.

The prior probability distribution output unit 5 receives setting data transmitted from the initial state setting unit 6 and the posterior probability distribution (posterior probability distribution data) transmitted from the posterior probability distribution estimation unit 4. In an initial state, the prior probability distribution output unit 5 generates prior probability distribution (prior probability distribution data) based on the setting data transmitted from the initial state setting unit 6, and then transmits the generated prior probability distribution (prior probability distribution data) to the observation selecting unit 2 and the likelihood obtaining unit 3.

In a state other than the initial state, the prior probability distribution output unit 5 transmits the posterior probability distribution (posterior probability distribution data) at time t, which is transmitted from the posterior probability distribution estimation unit 4, to the observation selecting unit 2 and the likelihood obtaining unit 3 as prior probability distribution (prior probability distribution data) at time t+1.

The initial state setting unit 6 stores data (initial values) for generating prior probability distribution in the initial state and transmits the data (initial values) to the prior probability distribution output unit 5.

1.2 Operation of State Estimation System

The operation of the state estimation system 1000 with the above-described structure will now be described.

Figure 3:
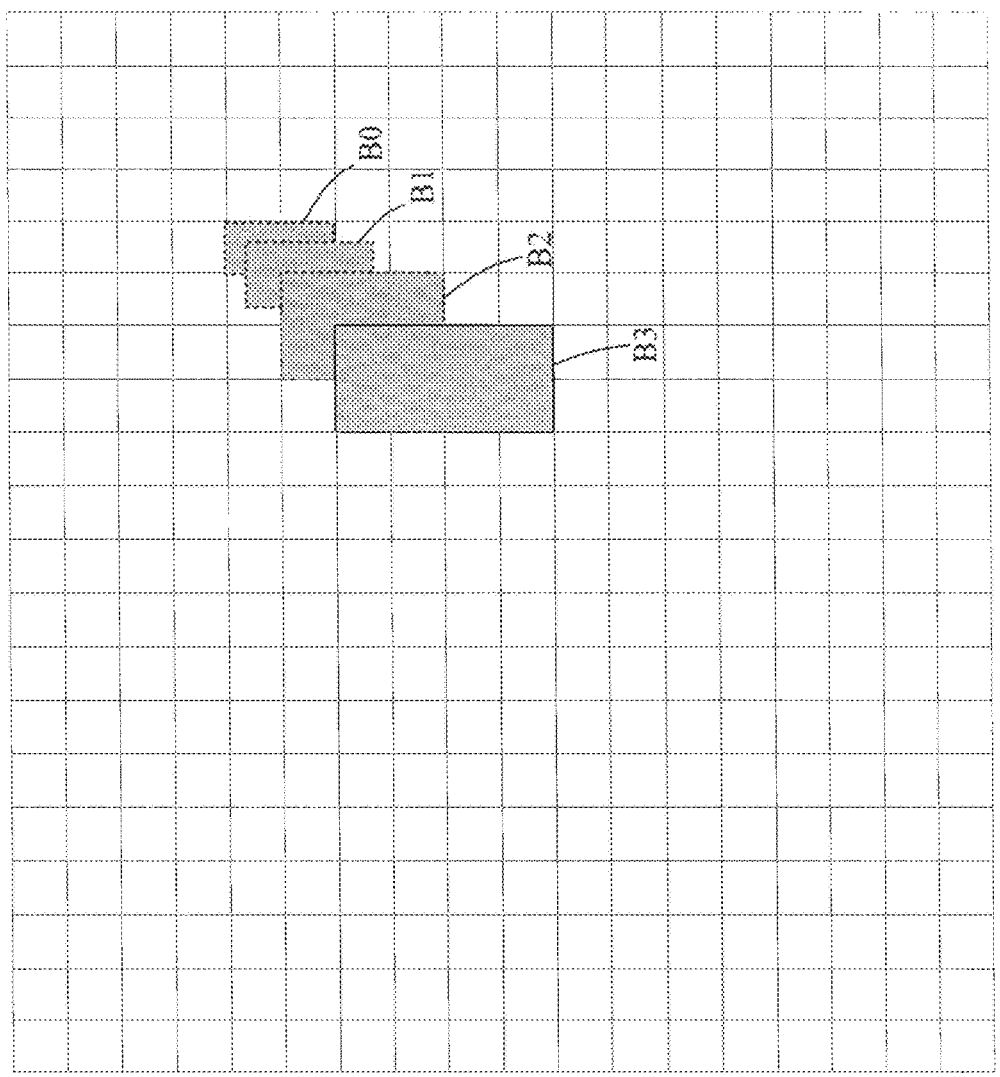
FIG. 3 is a schematic diagram showing an object moving in moving images.

In the following, processing for tracking a yellow object whose size changes will be described as an example. More specifically, as shown in FIG. 3, a case in which a yellow object moving while changing its size is tracked will be described. Note that FIG. 3 is a schematic diagram showing the object moving in moving images. In FIG. 3, the horizontal axis is the X-axis and the vertical axis is the Y-axis. The object moves while changing its size from B0 to B3 during a period from time t0 to time t3.

The central positions, widths (sizes in the X-axis direction), and heights (sizes in the Y-axis direction) of the objects B0 to B3 at each time are as follows.

<<Time t0>> Object: B0, Central Position: (X0, Y0), Width: W0, Height: H0

<<Time t1>> Object: B1, Central Position: (X1, Y1), Width: W1, Height: H1

<<Time t2>> Object: B2, Central Position: (X2, Y2), Width: W2, Height: H2

<<Time t3>> Object: B3, Central Position: (X3, Y3), Width: W3, Height: H3

Also, the following relations are satisfied.

$$W0 < W1 < W2 < W3$$

$$H0 < H1 < H2 < H3$$

$$W3 = 2 \times W0$$

$$H3 = 2 \times H0$$

Also, a state vector indicating the internal state of a target to be observed (a target to be tracked) at time t is assumed to be $x_t$. A feature observed at time t is assumed to be an observation vector $y_t$. A set of samples (a set of particles) $S_{t|t-1}$ generated in accordance with prior probability distribution $p(x_t|y_{t-1})$ is assumed to be $S_{t|t-1} = \{s_{t|t-1}^{(1)}, s_{t|t-1}^{(2)}, \ldots, s_{t|t-1}^{(M)}\}$. A set of samples (a set of particles) $S_{t|t}$ generated in accordance with prior probability distribution $p(x_t|y_t)$ is assumed to be $S_{t|t} = \{s_{t|t}^{(1)}, s_{t|t}^{(2)}, \ldots, s_{t|t}^{(M)}\}$.

Also, The i-th sample (particle) $s_{t|t}^{(i)}$ in the set of samples (the set of particles) $S_{t|t}$ is vector data having, as its internal variables, the coordinate position $(X_t^{(i)}, Y_t^{(i)})$ of the i-th sample (particle) in the image and the width $W_t^{(i)}$ and height $H_t^{(i)}$ of the image area centered on the coordinate position $(X_t^{(i)}, Y_t^{(i)})$. In other words, the sample (particle) $s_{t|t(i)}$ satisfies $s_{t|t}^{(i)} = (X_t^{(i)}, Y_t^{(i)}, W_t^{(i)}, H_t^{(i)})$.

The first observations (the first observation data) is assumed to be an image signal (object detection image signal) indicating the result of detection of the yellow object with W0 in width and H0 in height. The first object detection unit 112 generates an image (detection image), in which a pixel value of a pixel is larger (a pixel value is set to a value indicating the higher degree of being yellow in the image area with W0 in width and H0 in height) as the degree of being yellow in an image area that includes the pixel and has a size closer to the size of the width W0 by the height H0 in the image obtained by the first video input unit 111 is higher.

The second observation (second observation data) is assumed to be an image signal (object detection image signal) indicating the result of detecting a yellow object with 2×W0 in width and 2×H0 in height. The second object detection unit 122 generates an image (detection image), in which a pixel value of a pixel is larger (a pixel value is set to a value indicating the higher degree of being yellow in the image area with 2×W0 in width and 2×H0 in height) as the degree of being yellow in an image area that includes the pixel and has a size closer to the size of the width 2×W0 by the height 2×H0 in the image obtained by the second video input unit 121 is higher. Processing at time t0:

First, processing at time t0 will be described.

At time t0, the initial state setting unit 6 transmits initial values for setting the initial state of a target to be tracked to the prior probability distribution output unit 5.

The prior probability distribution output unit 5 generates a set of samples (particles) $S_{t|t-1}$ (t=t0) representing the initial state of the target to be tracked based on the initial values received from the initial state setting unit 6.

Processing for generating the set of samples (particles) $S_{t|t-1}$ (t=t0) representing the initial state of the target to be tracked may be performed such that a set of particles representing all possible states are generated as a set of particles representing the initial state, for example.

Prior probability distribution (prior probability distribution data) at time t0 which is generated by the prior probability distribution output unit 5 is transmitted to the observation selecting unit 2 and the likelihood obtaining unit 3.

Also, the first observation data obtained by the observation obtaining unit 11 of the observation obtaining unit 1 (the detection result with respect to the yellow image area with W0 in width and H0 in height (the object detection image)) and the second observation data obtained by the second observation obtaining unit 12 of the observation obtaining unit 1 (the detection result with respect to the yellow image area with 2×W0 in width and 2×H0 in height (the object detection image)) are transmitted to the observation selecting unit 2.

Until the target to be tracked is found (determined), the observation selecting unit 2 transmits both the first observation data and the second observation data to the likelihood obtaining unit 3, or transmits one piece of data, among the two pieces of data, that indicates more appropriate result of detecting the target object (e.g., an image (observation data) in which the average value of all pixels in the object detection image is higher) to likelihood obtaining unit 3.

Figure 4:
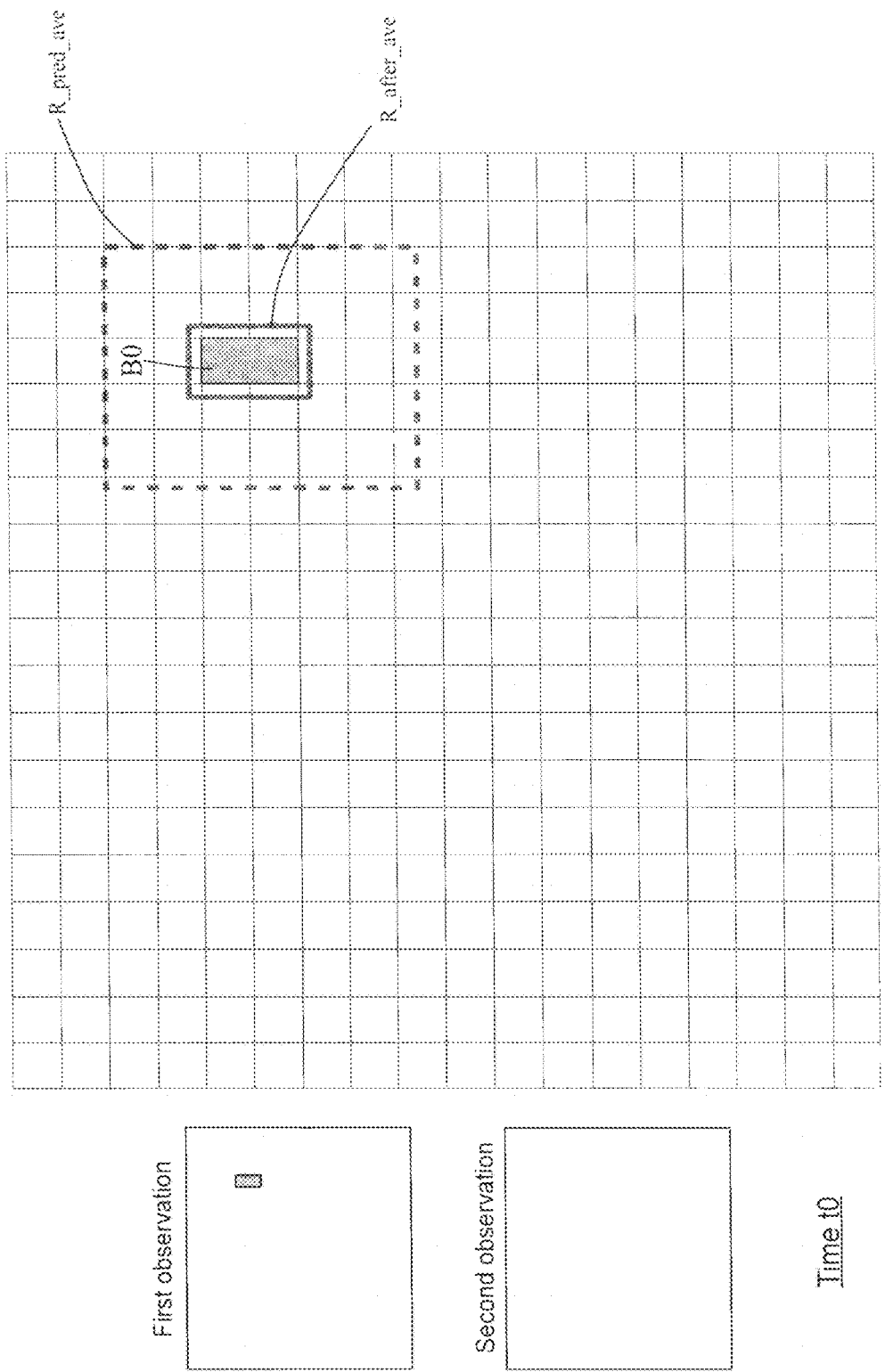
FIG. 4 is a schematic diagram showing first observation data (an object detection image) and second observation data (an object detection image) at time t0, and the state of an object B0 in an image at time t0.
Figure 5:
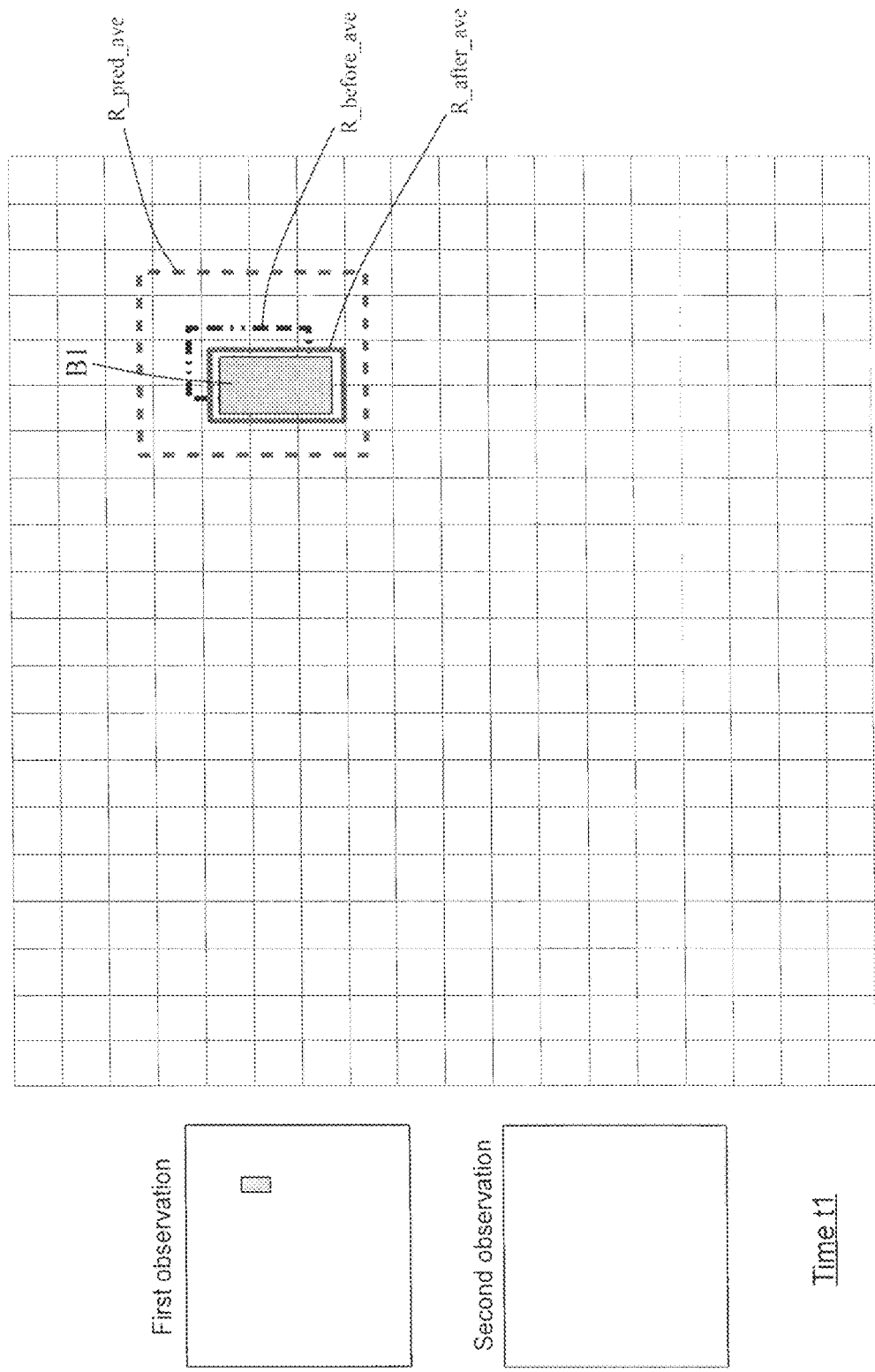
FIG. 5 is a schematic diagram showing the first observation data (an object detection image) and the second observation data (an object detection image) at time t1, and the state of an object B1 in the image at time t1.
Figure 7:
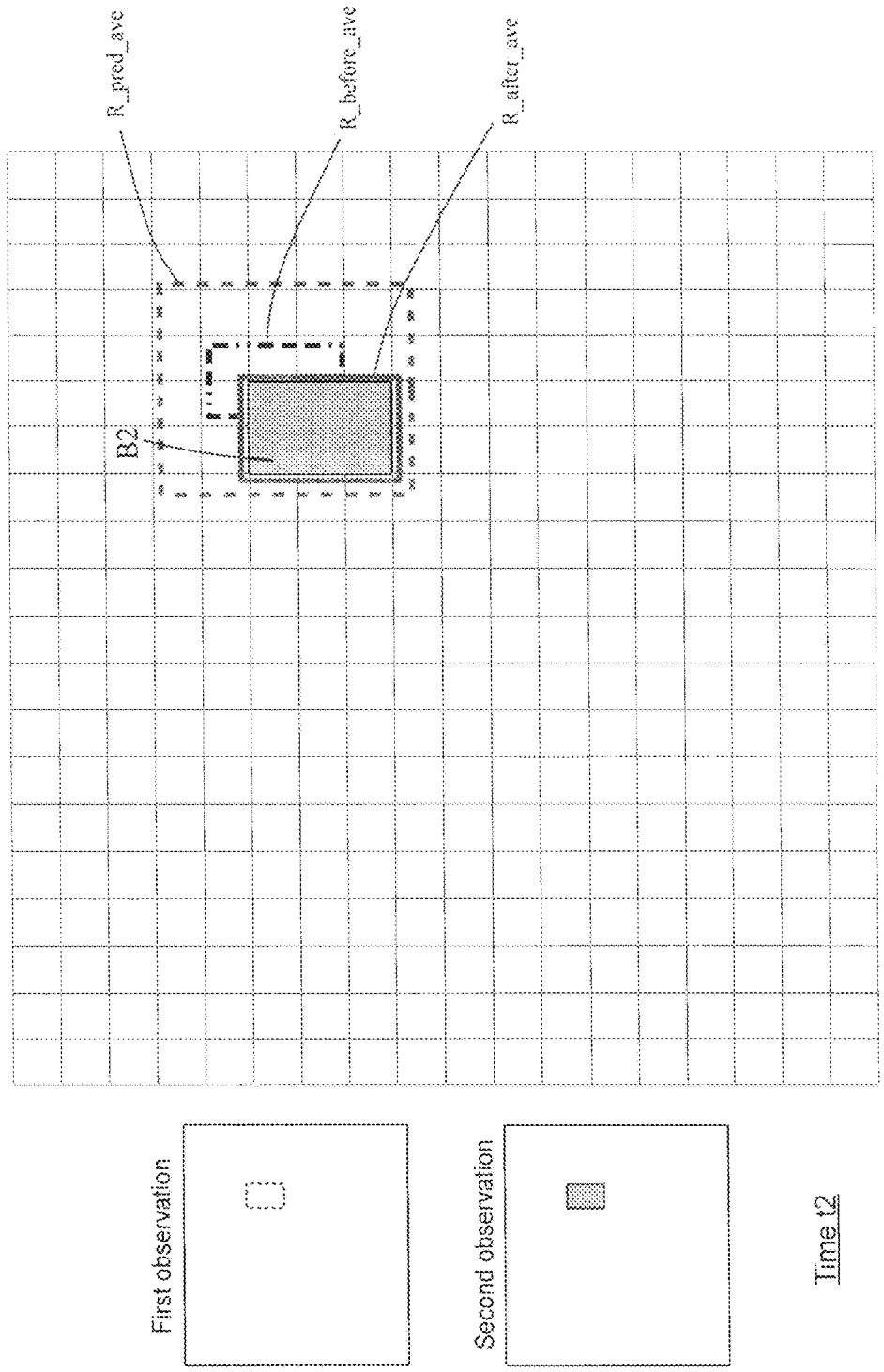
FIG. 7 is a schematic diagram showing the first observation data (an object detection image) and the second observation data (an object detection image) at time t2, and the state of an object B2 in the image at time t2.
Figure 8:
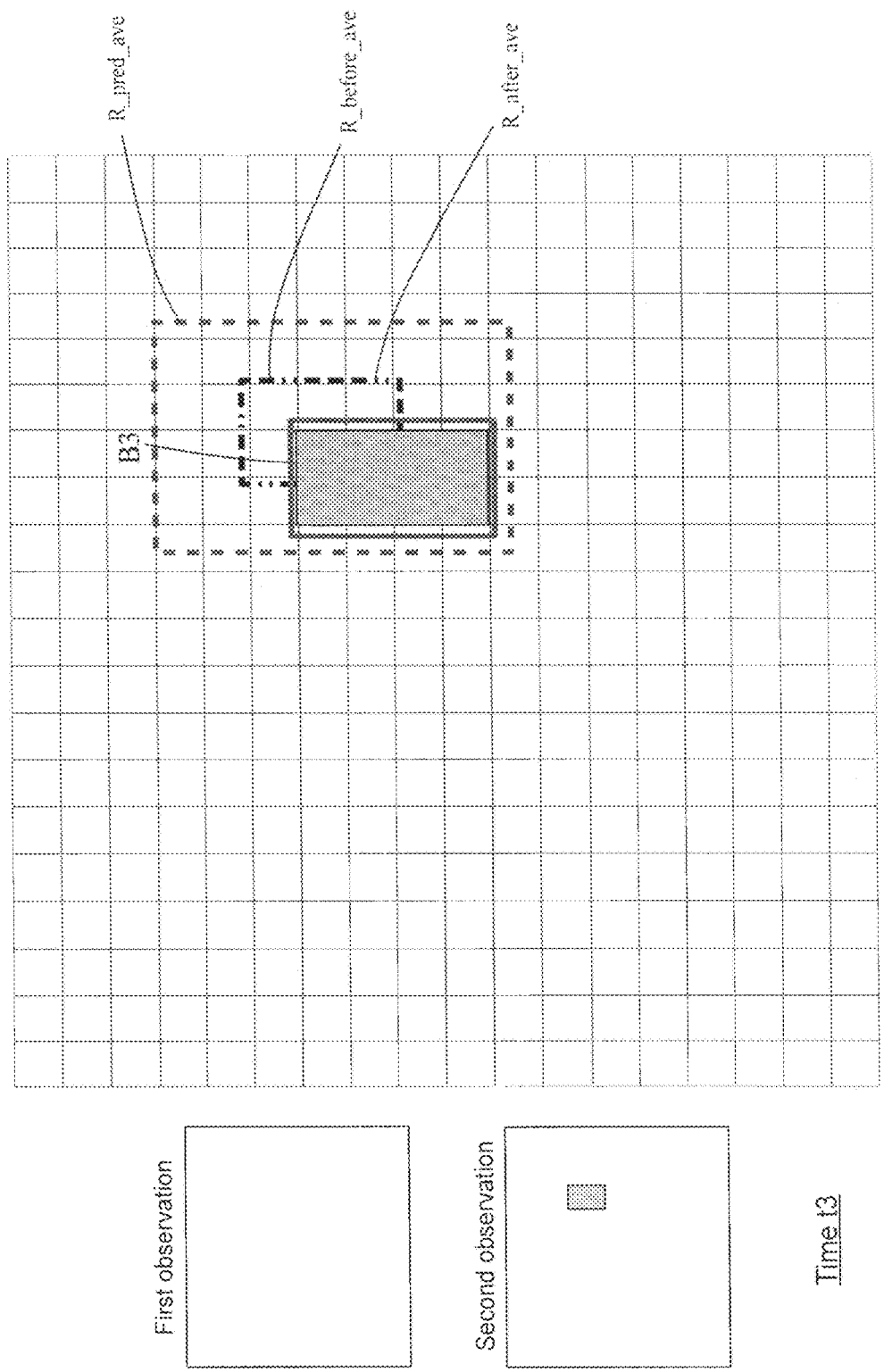
FIG. 8 is a schematic diagram showing the first observation data (an object detection image) and the second observation data (an object detection image) at time t3, and the state of an object B3 in the image at time t3.

FIG. 4 is a schematic diagram showing the first observation data (object detection image) and the second observation data (object detection image) at time t0, and the state of the object B0 in the image at time t0. The first observation data (object detection image) and the second observation data (object detection image) in the left portion of FIG. 4 shows the same image area, with its size reduced, as the diagram showing the state of the object B0 in the right portion of FIG. 4. FIGS. 5, 7 and 8 are depicted in a similar manner.

As shown in FIG. 4, at time t0, the detected image area is found only in the first observation (object detection image), and thus the observation selecting unit 2 transmits the first observation data to the likelihood obtaining unit 3.

The likelihood obtaining unit 3 performs prediction processing based on the set of particles $s_{t-1|t-1}$ in accordance with the prior probability distribution (prior probability distribution data) at time t0 which is generated by the prior probability distribution output unit 5 to obtain a set of particles $s_{t|t-1}$ after prediction processing.

The likelihood obtaining unit 3 then calculates likelihoods based on the set of particles $s_{t|t-1}$ after prediction processing and the first observation data (actual observation) transmitted from the observation selecting unit 2.

Note that the likelihood is set to the first observation data determined by the internal variables of each particle in the image area; that is, the likelihood is set to an integrated value of pixel values of pixels in the object detection image.

More specifically, for the i-th particle (1≤i≤M), the following is satisfied:

$$s_{t|t-1}^{(i)} = (X_t^{(i)}, Y_t^{(i)}, W_t^{(i)}, H_t^{(i)}).$$

Thus, the likelihood $wa_t^{(i)}$ for the i-th particle is set to the integrated value of pixel values of pixels, in the object detection image, included in the image area that is centered at the position $(X_t^{(i)}, Y_t^{(i)})$ in the object detection image and has a size of $W_t^{(i)}$ in width and $H_t^{(i)}$ in height.

The likelihood $wa_t$ calculated by the likelihood obtaining unit 3 and the predicted probability distribution data (the set of particles $s_{t|t-1}$ after prediction processing) are transmitted to the posterior probability distribution estimation unit 4.

The posterior probability distribution estimation unit 4 samples M particles, at the ratio proportional to the likelihood $wa_t^{(i)}$, without changing the total number of the particles (the particle $xa_t^{(i)}$ is sampled). Based on the distribution of the sampled M particles in the above processing, a set of samples (particles) $S_{t|t}$ generated in accordance with the posterior probability distribution $p(x_t|y_t)$ at time t0 is obtained such that $S_{t|t} = \{s_{t|t}^{(1)}, s_{t|t}^{(2)}, \ldots, s_{t|t}^{(M)}\}$ is satisfied.

FIG. 4 illustrates an area R_pred_ave representing the average value $(X_{t|t-1}\_ave, Y_{t|t-1}\_ave, W_{t|t-1}\_ave, H_{t|t-1}\_ave)$ of particles in accordance with the predicted probability distribution (data regarding the set of st|t−1 after prediction processing), which is obtained in the above processing.

Also, FIG. 4 illustrates an area R_after_ave representing the average value $(X_{t|t}\_ave, Y_{t|t}\_ave, W_{t|t}\_ave, H_{t|t}\_ave)$ of the set of samples (particles) $S_{t|t}$ generated in accordance with the posterior probability distribution $p(x_t|y_t)$ at time t0, which is obtained in the above processing.

Note that variables $W_{t|t}\_ave$ and $H_{t|t}\_ave$ are assumed to be obtained in a manner that the following equations are satisfied:

$$W_{t|t}\_ave = 1.4 \times W0$$

$$H_{t|t}\_ave = 1.4 \times H0.$$

Processing at time t1:

Next, processing at time t1 will be described.

FIG. 5 is a schematic diagram showing the first observation data (an object detection image) and the second observation data (an object detection image) at time t1, and the state of the object B1 in the image at time t1.

At time t1, the prior probability distribution output unit 5 transmits the posterior probability distribution (posterior probability distribution data) at time t0 as prior probability distribution (prior probability distribution data) at time t1 to the observation selecting unit 2 and the likelihood obtaining unit 3.

Also, the first observation data obtained by the first observation obtaining unit 11 of the observation obtaining unit 1 (the detection result with respect to the yellow image area with W0 in width and H0 in height (the object detection image)) and the second observation data obtained by the second observation obtaining unit 12 of the observation obtaining unit 1 (the detection result with respect to the yellow image area with 2×W0 in width and 2×H0 in height (the object detection image)) are transmitted to the observation selecting unit 2.

The observation selecting unit 2, based on the prior probability distribution data transmitted from the prior probability distribution output unit 5, determines which data to be selected from the first observation data and the second observation data.

In other words the observation selecting unit 2 determines which data to be selected from the first observation data and the second observation data, based on the average value $(X_{t-1|t-1}\_ave, Y_{t-1|t-1}\_ave, W_{t-1|t-1}\_ave, H_{t-1|t-1}\_ave)$ of the set of samples (particles) generated in accordance with the prior probability distribution $p(x_{t-1}|y_{t-1})$ at time t1.

More specifically, the observation selecting unit 2 compares the size of the image area representing the average value $(X_{t-1|t-1}\_ave, Y_{t-1|t-1}\_ave, W_{t-1|t-1}\_ave, H_{t-1|t-1}\_ave)$ of the set of particles $S_{t-1|t-1}$ with a predetermined threshold Th which is between the size (the width W0×the height H0) of the image area to be detected by the first observation obtaining unit 11 and the size (2×W0×2×H0) of the image area to be detected by the second observation obtaining unit 12, thereby determining which data to be selected from the first observation data and the second observation data. In the present embodiment, the threshold Th is set as Th=2×W0× H0. Furthermore, in the present embodiment, when the size of the image area representing the average value $(X_{t-1|t-1}\_ave, y_{t-1|t-1}\_ave, W_{t-1|t-1}\_ave, H_{t-1|t-1}\_ave)$ of the set of particles $S_{t-1|t-1}$ is less than the threshold Th, the first observation data is selected.

The size of the image area representing the average value $(X_{t-1|t-1}\_ave, Y_{t-1|t-1}\_ave, W_{t-1|t-1}\_ave, H_{t-1|t-1}\_ave)$ of the set of particles $S_{t-1|t-1}$ is as follows:

$$W_{t-1|t-1}\_ave = W_{t|t}\_ave = 1.4 \times W0$$

$$H_{t-1|t-1}\_ave = H_{t|t}\_ave = 1.4 \times H0.$$

Thus, the following is satisfied:

$$1.4 \times W0 \times 1.4 \times H0 = 1.96 \times W0 \times H0 < 2 \times W0 \times H0.$$

In this case, the size of the image area representing the average value $(X_{t-1|t-1}\_ave, Y_{t-1|t-1}\_ave, W_{t-1|t-1}\_ave, H_{t-1|t-1}\_ave)$ of the set of particles $S_{t-1|t-1}$ is less than the threshold Th (=2×W0×H0), and thus the observation selecting unit 2 selects the first observation data.

The selected first observation data is then transmitted to the likelihood obtaining unit 3.

The likelihood obtaining unit 3 performs prediction processing based on the set of particles $s_{t-1|t-1}$ in accordance with the prior probability distribution (prior probability distribution data) at time t1 which is generated by the prior probability distribution output unit 5 to obtain a set of particles $s_{t|t-1}$ after prediction processing.

In one example, Gaussian noise using the dynamics of random walks as the underlying assumption is added to the state of each particle included in the set of particles $S_{t-1|t-1}$ generated in accordance with the prior probability distribution (prior probability distribution data) at time t1, thereby obtaining a set of particles $S_{t|t-1}$ after prediction processing. More specifically, the set of particles $S_{t|t-1}$ resulting from the prediction is obtained by the formula below.

$$s_{t|t-1}^{(i)} = f(s_{t-1|t-1}^{(i)}, v_t^{(i)})$$

where $v_t^{(i)}$ is system noise in accordance with the Gaussian distribution, f( ) is a state transition function indicating a change in the states between time t−1 and time t, and $v_t^{(i)}$ is system noise.

In more detail, the internal state of the i-th particle in accordance with the prior probability distribution (prior probability distribution data) at time t1 is $(X_{t-1|t-1}^{(i)}, Y_{t-1|t-1}^{(i)}, W_{t-1|t-1}^{(i)}, H_{t-1|t-1}^{(i)})$, and the internal state of the i-th particle resulting from the prediction processing is $(X_{t|t-1}^{(i)}, Y_{t|t-1}^{(i)}, W_{t|t-1}^{(i)}, H_{t|t-1}^{(i)})$. Thus, the likelihood obtaining unit 3 obtains the set of particles st|t−1 resulting from the prediction as $X_{t|t-1}^{(i)} = X_{t-1|t-1}^{(i)} + \Delta X^{(i)}$, $Y_{t|t-1}^{(i)} = Y_{t-1|t-1}^{(i)} + \Delta Y^{(i)}$, $W_{t|t-1}^{(i)} = W_{t-1|t-1}^{(i)} + \Delta W^{(i)}$, and $H_{t|t-1}^{(i)} = H_{t-1|t-1}^{(i)} + \Delta H^{(i)}$, where $\Delta X^{(i)}$, $\Delta Y^{(i)}$, $\Delta W^{(i)}$, and $\Delta H^{(i)}$ are in accordance with the Gaussian distribution.

The image area R_pred_ave determined by the average value of the set of particles $s_{t|t-1}$ after prediction processing, which are obtained as described above, is shown in FIG. 5.

The likelihood obtaining unit 3 then calculates likelihoods based on the set of particles $s_{t|t-1}$ after prediction processing and the first observation data (actual observation) transmitted from the observation selecting unit 2.

Note that the likelihood is set to the first observation data determined by the internal variables of each particle in the image area; that is, the likelihood is set to an integrated value of pixel values of pixels in the object detection image.

More specifically, for the i-th particle (1≤i≤M), the following is satisfied: $s_{t|t-1}^{(i)} = (X_t^{(i)}, Y_t^{(i)}, W_t^{(i)}, H_t^{(i)})$. Thus, the likelihood $wa_t^{(i)}$ for the i-th particle is set to the integrated value of pixel values of pixels, in the object detection image, included in the image area that is centered at the position $(X_t^{(i)}, Y_t^{(i)})$ in the object detection image and has a size of $W_t^{(i)}$ in width and $H_t^{(i)}$ in height.

The likelihood $wa_t$ calculated by the likelihood obtaining unit 3 and the predicted probability distribution data (data regarding the set of particles $s_{t|t-1}$ after prediction processing) are transmitted to the posterior probability distribution estimation unit 4.

The posterior probability distribution estimation unit 4 samples M particles, at the ratio proportional to the likelihood $wa_t^{(i)}$, without changing the total number of the particles (the particle $xa_t^{(i)}$ is sampled). Based on the distribution of the sampled M particles in the above processing, a set of samples (particles) $S_{t|t}$ generated in accordance with the posterior probability distribution $p(x_t|y_t)$ at time t1 is obtained such that $S_{t|t} = \{s_{t|t}^{(1)}, s_{t|t}^{(2)}, \ldots, s_{t|t}^{(M)}\}$ is satisfied.

FIG. 5 illustrates (1) the area R_before_ave representing the average value of particles in accordance with the prior probability distribution at time t1, and (2) the area R_pred_ave representing the average value $(X_{t|t-1}\_ave, Y_{t|t-1}\_ave, W_{t|t-1}\_ave, H_{t|t-1}\_ave)$ of particles in accordance with the predicted probability distribution (data regarding the set of $s_{t|t-1}$ after prediction processing), which is obtained in the above processing.

Also, FIG. 5 illustrates the area R_after_ave representing the average value $(X_{t|t}\_ave, Y_{t|t}\_ave, W_{t|t}\_ave, H_{t|t}\_ave)$ of the set of samples (particles) $S_{t|t}$ generated in accordance with the posterior probability distribution $p(x_t|y_t)$ at time t1, which is obtained in the above processing.

Note that variables $W_{t|t}\_ave$ and $H_{t|t}\_ave$ are assumed to be obtained in a manner that the following equations are satisfied:

$$W_{t|t}\_ave = 1.6 \times W0$$

$$H_{t|t}\_ave = 1.4 - H0.$$

Figure 6:
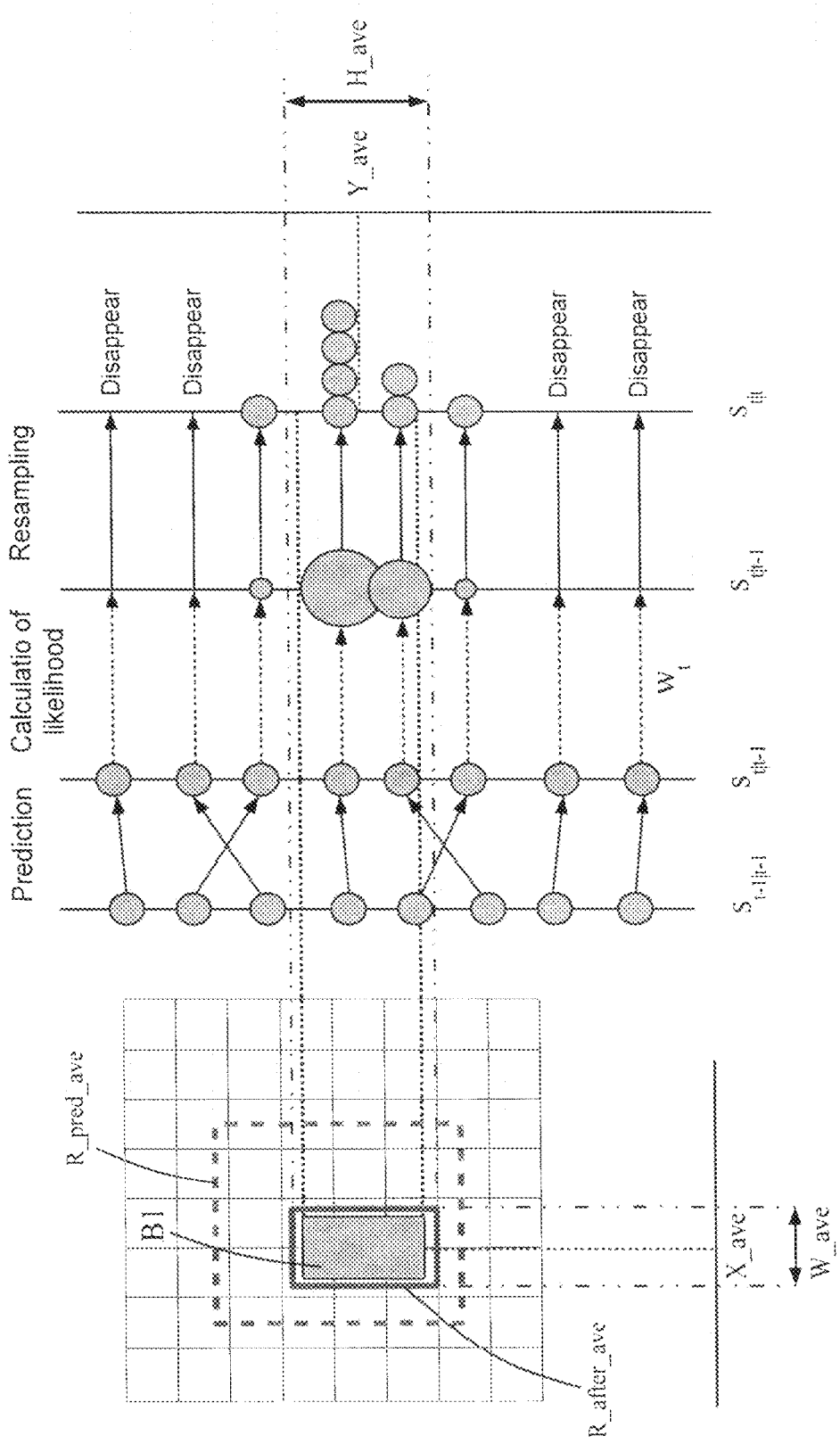
FIG. 6 is a diagram describing calculation of likelihoods and prediction processing performed by a likelihood obtaining unit 3, and resampling performed by a posterior probability distribution estimation unit 4, at time t1.

FIG. 6 is a diagram describing calculation of likelihoods and prediction processing performed by the likelihood obtaining unit 3, and resampling performed by the posterior probability distribution estimation unit 4. FIG. 6 is a diagram illustrating an image area around the object B1, which is extracted from FIG. 5.

FIG. 6 schematically illustrates particles only with respect to the Y-axis direction.

As shown in FIG. 6, performing the prediction processing on the set of particles $s_{t-1|t-1}$ in accordance with the prior probability distribution at time t1 obtains the set of particles $S_{t|t-1}$ in accordance with the probability distribution after prediction processing. For particles in the set of particles $s_{t|t-1}$ in accordance with the probability distribution after prediction processing, the values of likelihoods of particles the center positions of which are in the image area of the object B1 are large. In FIG. 6, a likelihood with a large value is depicted as a large circle.

The posterior probability distribution estimation unit 4 samples M particles at the ratio proportional to the likelihood, and thus, as shown in FIG. 6, a particle with a large likelihood is reproduced as a plurality of particles. In this way, the set of samples (particles) $S_{t|t}$ in accordance with the posterior probability distribution at time t1 is obtained.

The average value of the set of samples (particles) $S_{t|t}$ in accordance with the posterior probability distribution at time t1 is calculated, thereby obtaining the average position in the Y-axis as Y_ave in FIG. 6 and the average height as H_ave in FIG. 6.

For particles in the X-axis direction, the same processing as the above is performed; that is, the average value of the set of samples (particles) $S_{t|t}$ in accordance with the posterior probability distribution at time t1 is calculated, thereby obtaining the average position in the X-axis as X_ave in FIG. 6 and the average width as W_ave in FIG. 6.

Through the above processing, the image area determined by the average value of the set of samples (particles) $S_{t|t}$ in accordance with the posterior probability distribution at time t1 is obtained as the image area R_after_ave in FIG. 6.

Processing at time t2:

Next, processing at time t2 will be described.

FIG. 7 is a schematic diagram showing the first observation data (object detection image) and the second observation data (object detection image) at time t2, and the state of an object B2 in the image at time t2.

At time t2, the prior probability distribution output unit 5 transmits the posterior probability distribution (posterior probability distribution data) at time t1 as prior probability distribution (prior probability distribution data) at time t2 to the observation selecting unit 2 and the likelihood obtaining unit 3.

Also, the first observation data obtained by the first observation obtaining unit 11 of the observation obtaining unit 1 (the detection result with respect to the yellow image area with W0 in width and H0 in height (the object detection image)) and the second observation data obtained by the second observation obtaining unit 12 of the observation obtaining unit 1 (the detection result with respect to the yellow image area with 2×W0 in width and 2×H0 in height (the object detection image)) are transmitted to the observation selecting unit 2.

The observation selecting unit 2, based on the prior probability distribution data transmitted from the prior probability distribution output unit 5, determines which data to be selected from the first observation data and the second observation data.

In other words the observation selecting unit 2 determines which data to be selected from the first observation data and the second observation data, based on the average value $(X_{t-1|t-1}\_ave, Y_{t-1|t-1}\_ave, W_{t-1|t-1}\_ave, H_{t-1|t-1}\_ave)$ of the set of samples (particles) $S_{t-1|t-1}$ generated in accordance with the prior probability distribution $p(x_{t-1}|y_{t-1})$ at time t2.

The size of the image area representing the average value $(X_{t-1|t-1}\_ave, Y_{t-1|t-1}\_ave, W_{t-1|t-1}\_ave, H_{t-1|t-1}\_ave)$ of the set of particles $S_{t-1|t-1}$ is as follows:

$$W_{t-1|t-1}\_ave = W_{t|t}\_ave = 1.6 \times W0$$

$$H_{t-1|t-1}\_ave = H_{t|t}\_ave = 1.4 \times H0.$$

Thus, the following is satisfied:

$$1.6 \times W0 \times 1.4 \times H0 = 2.24 \times W0 \times H0 > 2 \times W0 \times H0.$$

In this case, the size of the image area representing the average value $(X_{t-1|t-1}\_ave, Y_{t-1|t-1}\_ave, W_{t-1|t-1}\_ave, H_{t-1|t-1}\_ave)$ of the set of particles $S_{t-1|t-t}$ is greater than the threshold Th (=2×W0×H0), and thus the observation selecting unit 2 selects the second observation data.

The selected second observation data is then transmitted to the likelihood obtaining unit 3.

The likelihood obtaining unit 3 performs prediction processing based on the set of particles $s_{t-1|t-1}$ in accordance with the prior probability distribution (prior probability distribution data) at time t2 which is generated by the prior probability distribution output unit 5 to obtain a set of particles $s_{t|t-1}$ after prediction processing.

In one example, Gaussian noise using the dynamics of random walks as the underlying assumption is added to the state of each particle included in the set of particles $S_{t-1|t-1}$ generated in accordance with the prior probability distribution (prior probability distribution data) at time t2, thereby obtaining a set of particles $S_{t|t-1}$ after prediction processing. More specifically, the set of particles $S_{t|t-1}$ after prediction processing is obtained by the formula below.

$$s_{t|t-1}^{(i)} = f(s_{t-1|t-1}^{(i)}, v_t^{(i)})$$

where $v_t^{(i)}$ is system noise in accordance with the Gaussian distribution, f( ) is a state transition function indicating a change in the states between time t−1 and time t, and $v_t^{(i)}$ is system noise.

In more detail, the internal state of the i-th particle in accordance with the prior probability distribution (prior probability distribution data) at time t2 is $(X_{t-1|t-1}^{(i)}, Y_{t-1|t-1}^{(i)}, W_{t-1|t-1}^{(i)}, H_{t-1|t-1}^{(i)})$, and the internal state of the i-th particle resulting from the prediction processing is $(X_{t|t-1}^{(i)}, Y_{t|t-1}^{(i)}, W_{t|t-1}^{(i)}, H_{t|t-1}^{(i)})$. Thus, the likelihood obtaining unit 3 obtains the set of particles $s_{t|t-1}$ resulting from the prediction as $X_{t|t-1}^{(i)} = X_{t-1|t-1}^{(i)} + \Delta X^{(i)}$, $Y_{t|t-1}^{(i)} = Y_{t-1|t-1}^{(i)} + \Delta Y^{(i)}$, $W_{t|t-1}^{(i)} = W_{t-1|t-1}^{(i)} + \Delta W^{(i)}$, and $H_{t|t-1}^{(i)} = H_{t-1|t-1}^{(i)} + \Delta H^{(i)}$, where $\Delta X^{(i)}$, $\Delta Y^{(i)}$, $\Delta W^{(i)}$, and $\Delta H^{(i)}$ are in accordance with the Gaussian distribution.

The image area R_pred_ave determined by the average value of the set of particles $s_{t|t-1}$ after prediction processing, which are obtained as described above, is shown in FIG. 7.

The likelihood obtaining unit 3 then calculates likelihoods based on the set of particles $s_{t|t-1}$ after prediction processing and the second observation data (actual observation) transmitted from the observation selecting unit 2.

Note that the likelihood is set to the second observation data determined by the internal variables of each particle in the image area; that is, the likelihood is set to an integrated value of pixel values of pixels in the object detection image.

More specifically, for the i-th particle (1≤i≤M), the following is satisfied:

$$s_{t|t-1}^{(i)} = (X_t^{(i)}, Y_t^{(i)}, W_t^{(i)}, H_t^{(i)}).$$

Thus, the likelihood $wa_t^{(i)}$ for the i-th particle is set to the integrated value of pixel values of pixels, in the object detection image, included in the image area that is centered at the position $(X_t^{(i)}, Y_t^{(i)})$ in the object detection image and has a size of $W_t^{(i)}$ in width and $H_t^{(i)}$ in height.

As shown in FIG. 7, the second observation data indicates more appropriate result for detecting the image area of the object B2 than the first observation data. Thus, calculating likelihoods with the second observation data enables the likelihoods of particles in the image area of the object B2 to be large. This increases the number of particles included in the image area of the object B2 in the posterior probability distribution. At time t2, calculating likelihoods using the second observation data selected by the observation selecting unit 2 enables processing for tracking the object to be performed more appropriately.

The likelihood $wa_t$ calculated by the likelihood obtaining unit 3 and the predicted probability distribution data (data regarding the set of particles $s_{t|t-1}$ after prediction processing) are transmitted to the posterior probability distribution estimation unit 4.

The posterior probability distribution estimation unit 4 samples M particles, at the ratio proportional to the likelihood $wa_t^{(i)}$, without changing the total number of the particles (the particle $xa_t^{(i)}$ is sampled). Based on the distribution of the sampled M particles in the above processing, a set of samples (particles) $S_{t|t}$ generated in accordance with the posterior probability distribution $p(s_t|y_t)$ at time t2 is obtained such that $S_{t|t} = \{s_{t|t}^{(1)}, s_{t|t}^{(2)}, \ldots, s_{t|t}^{(M)}\}$ is satisfied.

FIG. 7 illustrates (1) the area R_before_ave representing the average value of particles in accordance with the prior probability distribution at time t2, and (2) the area R_pred_ave representing the average value $(X_{t|t-1}\_\text{ave}, Y_{t|t-1}\_\text{ave}, W_{t|t-1}\_\text{ave}, H_{t|t-1}\_\text{ave})$ of particles in accordance with the predicted probability distribution (data regarding the set of $s_{t|t-1}$ after prediction processing), which is obtained in the above processing.

Also, FIG. 7 illustrates the area R_after_ave representing the average value $(X_{t|t}\_\text{ave}, Y_{t|t}\_\text{ave}, W_{t|t}\_\text{ave}, H_{t|t}\_\text{ave})$ of the set of samples (particles) $S_{t|t}$ generated in accordance with the posterior probability distribution $p(x_t|y_t)$ at time t2, which is obtained in the above processing.

Note that variables $W_{t|t}\_\text{ave}$ and $H_{t|t}\_\text{ave}$ are assumed to be obtained in a manner that the following equations are satisfied:

$$W_{t|t}\_\text{ave} = 2.3 \times W0$$

$$H_{t|t}\_\text{ave} = 1.6 \times H0.$$

Processing at time t3:

Next, processing at time t3 will be described.

FIG. 8 is a schematic diagram showing the first observation data (object detection image) and the second observation data (object detection image) at time t3, and the state of an object B3 in the image at time t3.

At time t3, the prior probability distribution output unit 5 transmits the posterior probability distribution (posterior probability distribution data) at time t2 as prior probability distribution (prior probability distribution data) at time t3 to the observation selecting unit 2 and the likelihood obtaining unit 3.

Also, the first observation data obtained by the first observation obtaining unit 11 of the observation obtaining unit 1 (the detection result with respect to the yellow image area with W0 in width and H0 in height (the object detection image)) and the second observation data obtained by the second observation obtaining unit 12 of the observation obtaining unit 1 (the detection result with respect to the yellow image area with 2×W0 in width and 2×H0 in height (the object detection image)) are transmitted to the observation selecting unit 2.

The observation selecting unit 2, based on the prior probability distribution data transmitted from the prior probability distribution output unit 5, determines which data to be selected from the first observation data and the second observation data.

In other words, the observation selecting unit 2 determines which data to be selected from the first observation data and the second observation data, based on the average value $(X_{t-1|t-1}\_\text{ave}, Y_{t-1|t-1}\_\text{ave}, W_{t-1|t-1}\_\text{ave}, H_{t-1|t-1}\_\text{ave})$ of the set of samples (particles) $S_{t-1|t-1}$ generated in accordance with the prior probability distribution $p(x_{t-1}|y_{t-1})$ at time t3.

The size of the image area representing the average value $(X_{t-1|t-1}\_ave, Y_{t-1|t-1}\_ave, W_{t-1|t-1}\_ave, H_{t-1|t-1}\_ave)$ of the set of particles $S_{t-1|t-1}$ is as follows:

$$W_{t-1|t-1}\_ave = W_{t|t}\_ave = 2.3 \times W0$$

$$H_{t-1|t-1}\_ave = H_{t|t}\_ave = 1.6 \times H0.$$

Thus, the following is satisfied:

$$2.3 \times W0 \times 1.6 \times H0 = 3.68 \times W0 \times H0 > 2 \times W0 \times H0.$$

In this case, the size of the image area representing the average value $(X_{t-1|t-1}\_ave, Y_{t-1|t-1}\_ave, W_{t-1|t-1}\_ave, H_{t-1|t-1}\_ave)$ of the set of particles $S_{t-1|t-1}$ is greater than the threshold Th $(=2 \times W0 \times H0)$, and thus the observation selecting unit 2 selects the second observation data.

The selected second observation data is then transmitted to the likelihood obtaining unit 3.

The likelihood obtaining unit 3 performs prediction processing based on the set of particles $s_{t-1|t-1}$ in accordance with the prior probability distribution (prior probability distribution data) at time t3 which is generated by the prior probability distribution output unit 5 to obtain a set of particles $s_{t|t-1}$ after prediction processing.

In one example, Gaussian noise using the dynamics of random walks as the underlying assumption is added to the state of each particle included in the set of particles $S_{t-1|t-1}$ generated in accordance with the prior probability distribution (prior probability distribution data) at time t3, thereby obtaining a set of particles $S_{t|t-1}$ after prediction processing. More specifically, the set of particles $S_{t|t-1}$ resulting from the prediction is obtained by the following formula:

$$s_{t|t-1}^{(i)} = f(s_{t-1|t-1}^{(i)}, v_t^{(i)})$$

where $v_t^{(i)}$ is system noise in accordance with the Gaussian distribution, f( ) is a state transition function indicating a change in the states between time t−1 and time t, and $v_t^{(i)}$ is system noise.

In more detail, the internal state of the i-th particle in accordance with the prior probability distribution (prior probability distribution data) at time t3 is $(X_{t-1|t-1}^{(i)}, H_{t-1|t-1}^{(i)}, W_{t-1|t-1}^{(i)}, H_{t-1|t-1}^{(i)})$, and the internal state of the i-th particle resulting from the prediction processing is $(X_{t|t-1}^{(i)}, Y_{t|t-1}^{(i)}, W_{t|t-1}^{(i)}, H_{t|t-1}^{(i)})$. Thus, the likelihood obtaining unit 3 obtains the set of particles st|t−1 resulting from the prediction as $X_{t|t-1}^{(i)} = X_{t-1|t-1}^{(i)} + \Delta X^{(i)}$, $Y_{t|t-1}^{(i)} = Y_{t-1|t-1}^{(i)} + \Delta Y^{(i)}$, $W_{t|t-1}^{(i)} = W_{t-1|t-1}^{(i)} + \Delta W^{(i)}$, and $H_{t|t-1}^{(i)} = H_{t-1|t-1}^{(i)} + \Delta H^{(i)}$, where $\Delta X^{(i)}, \Delta Y^{(i)}, \Delta W^{(i)}$, and $\Delta H^{(i)}$ are in accordance with the Gaussian distribution.

The image area R_pred_ave determined by the average value of the set of particles $s_{t|t-1}$ after prediction processing, which are obtained as described above, is shown in FIG. 8.

The likelihood obtaining unit 3 then calculates likelihoods based on the set of particles $s_{t|t-1}$ after prediction processing and the second observation data (actual observation) transmitted from the observation selecting unit 2.

Note that the likelihood is set to the second observation data determined by the internal variables of each particle in the image area; that is, the likelihood is set to an integrated value of pixel values of pixels in the object detection image.

More specifically, for the i-th particle (1≤i≤M), the following is satisfied:

$$s_{t|t-1}^{(i)} = (X_t^{(i)}, Y_t^{(i)}, W_t^{(i)}, H_t^{(i)}).$$

Thus, the likelihood $wa_t^{(i)}$ for the i-th particle is set to the integrated value of pixel values of pixels, in the object detection image, included in the image area that is centered at the position $(X_t^{(i)}, Y_t^{(i)})$ in the object detection image and has a size of $W_t^{(i)}$ in width and $H_t^{(i)}$ in height.

As shown in FIG. 8, the second observation data indicates more appropriate result for detecting the image area of the object B3 than the first observation data. Thus, calculating likelihoods with the second observation data enables the likelihoods of particles in the image area of the object B3 to be large. This increases the number of particles included in the image area of the object B3 in the posterior probability distribution. At time t3, calculating likelihoods using the second observation data selected by the observation selecting unit 2 enables processing for tracking the object to be performed more appropriately.

The likelihood $wa_t$ calculated by the likelihood obtaining unit 3 and the predicted probability distribution data (data regarding the set of particles $s_{t|t-1}$ after prediction processing) are transmitted to the posterior probability distribution estimation unit 4.

The posterior probability distribution estimation unit 4 samples M particles, at the ratio proportional to the likelihood $wa_t^{(i)}$ without changing the total number of the particles (the particle $xa_t^{(i)}$ is sampled). Based on the distribution of the sampled M particles in the above processing, a set of samples (particles) $S_{t|t}$ generated in accordance with the posterior probability distribution $p(x_t|y_t)$ at time t3 is obtained such that $S_{t|t} = \{s_{t|t}^{(1)}, s_{t|t}^{(2)}, \ldots, s_{t|t}^{(M)}\}$ is satisfied.

FIG. 8 illustrates (1) the area R_before_ave representing the average value of particles in accordance with the prior probability distribution at time t3, and (2) the area R_pred_ave representing the average value $(X_{t|t-1}\_ave, Y_{t|t-1}\_ave, W_{t|t-1}\_ave, H_{t|t-1}\_ave)$ of particles in accordance with the predicted probability distribution (data regarding the set of $s_{t|t-1}$ after prediction processing), which is obtained in the above processing.

Also, FIG. 8 illustrates the area R_after_ave representing the average value $(X_{t|t}\_ave, Y_{t|t}\_ave, W_{t|t}\_ave, H_{t|t}\_ave)$ of the set of samples (particles) $S_{t|t}$ generated in accordance with the posterior probability distribution $p(x_t|y_t)$ at time t3, which is obtained in the above processing.

Continuing the above processing enables the processing for tracking the object to be performed by the state estimation system 1000.

In the state estimation system 1000, the observation obtaining unit 1 obtains a plurality of observations (observation data), and the observation selecting unit 2, in accordance with the state of the target to be tracked (in the present embodiment, the size of the object), selects more appropriate observation data. The state estimation system 1000 then calculates likelihoods based on the selected observation data, and performs resampling using the calculated likelihoods. Thus, the state estimation system 1000 can obtain appropriate posterior probability distribution data even when the state of the target to be tracked changes (in the present embodiment, even when the size of the object changes). As a result, the state estimation system 1000 appropriately estimates the internal state of an observation target, and thus precisely tracks, for example, an object whose size varies in moving images or a plurality of objects with different sizes in moving images.

Second Embodiment

Figure 9:
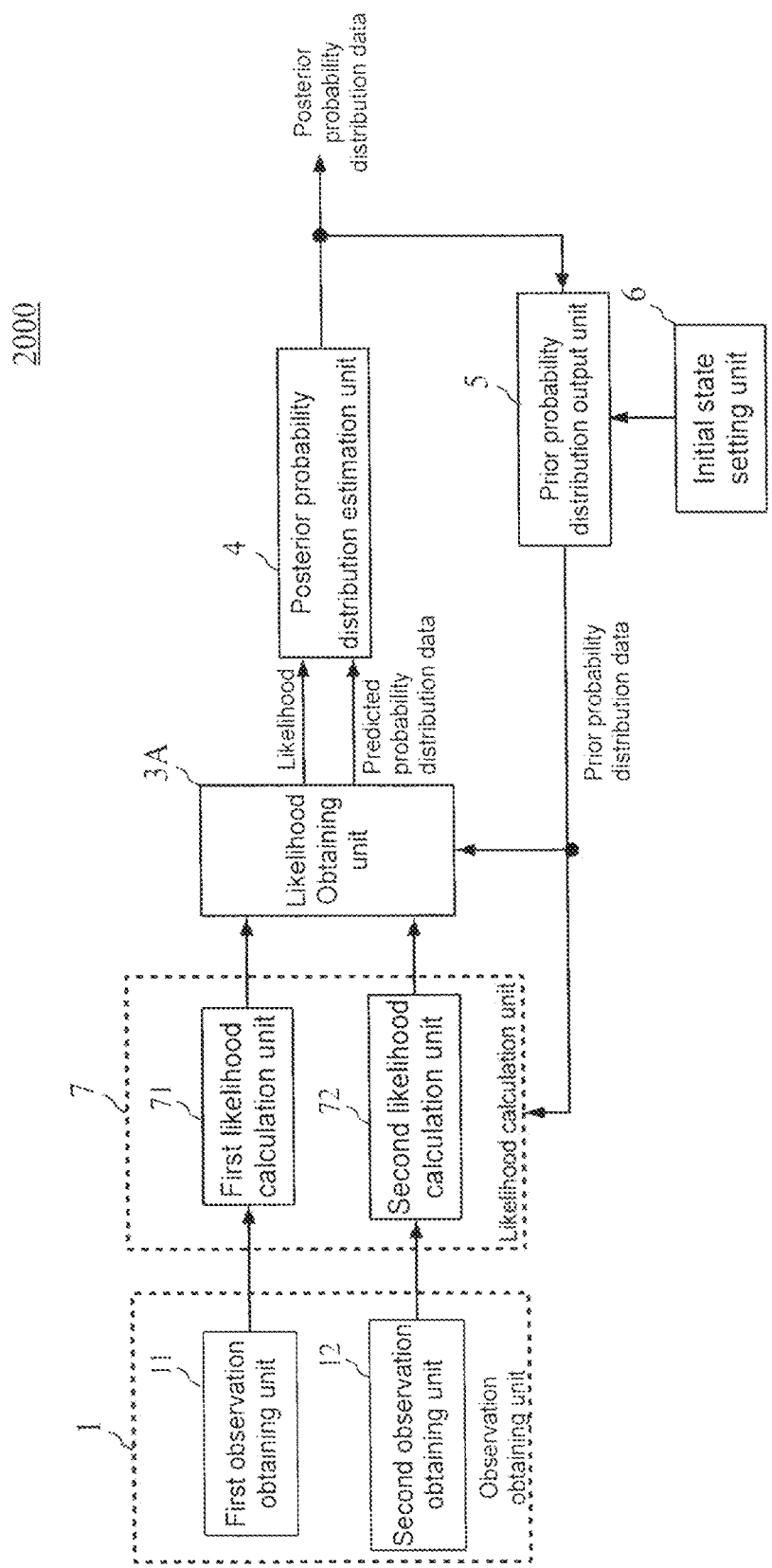
FIG. 9 is a schematic block diagram of a state estimation system 2000 according to a second embodiment.

A second embodiment will now be described.
2.1 Structure of State Estimation System
FIG. 9 is a schematic block diagram of a state estimation system 2000 according to the second embodiment.

As shown in FIG. 9, the state estimation system 2000 includes an observation obtaining unit 1, a likelihood calculation unit 7, a likelihood obtaining unit 3A, a posterior probability distribution estimation unit 4, a prior probability distribution output unit 5, and an initial state setting unit 6.

In the state estimation system 2000, the observation obtaining unit 1, the posterior probability distribution estimation unit 4, the prior probability distribution output unit 5, and the initial state setting unit 6 are identical to the corresponding components of the state estimation system 1000 of the first embodiment.

Note that the prior probability distribution output unit 5 differs from the prior probability distribution output unit 5 described in the first embodiment only in its output destination. More specifically, the prior probability distribution output unit 5 of the state estimation system 2000 transmits the generated prior probability distribution (prior probability distribution data) to the likelihood calculation unit 7 and the likelihood obtaining unit 3A.

The components in the present embodiment that are the same as the components described in the first embodiment will be given the same reference numerals as those components and will not be described in detail.

As shown in FIG. 9, the likelihood calculation unit 7 includes a first likelihood calculation unit 71 and a second likelihood calculation unit 72.

The first likelihood calculation unit 71 receives a first observation (first observation data) transmitted from the first observation obtaining unit 11 and prior probability distribution (prior probability distribution data) transmitted from the prior probability distribution output unit 5. The first likelihood calculation unit 71 performs prediction processing for the prior probability distribution (prior probability distribution data) to obtain predicted probability distribution (predicted probability distribution data). The first likelihood calculation unit 71 then calculates likelihoods (first likelihoods) based on the first observation (first observation data) and the predicted probability distribution (predicted probability distribution data). The first likelihood calculation unit 71 transmits the first likelihoods (first likelihood data) calculated using the first observation data and the predicted probability distribution (predicted probability distribution data) to the likelihood obtaining unit 3A.

The second likelihood calculation unit 72 receives the second observation (the second observation data) transmitted from the second observation obtaining unit 12 and the prior probability distribution (prior probability distribution data) transmit from the prior probability distribution output unit 5. The second likelihood calculation unit 72 performs prediction processing for the prior probability distribution (prior probability distribution data) to obtain predicted probability distribution (predicted probability distribution data). The second likelihood calculation unit 72 then calculates likelihoods (second likelihoods) based on the second observation (second observation data) and the predicted probability distribution (predicted probability distribution data). The second likelihood calculation unit 72 transmits the second likelihoods (second likelihood data) calculated using the second observation data and the predicted probability distribution (predicted probability distribution data) to the likelihood obtaining unit 3A.

Note that either the first likelihood calculation unit 71 or the second likelihood calculation unit 72 may perform predict processing for the prior probability distribution (prior probability distribution data). In this case, the predicted posterior probability distribution (predicted posterior probability distribution data) obtained by either the first likelihood calculation unit 71 or the second likelihood calculation unit 72 is transmitted to the other. The predicted posterior probability distribution (predicted posterior probability distribution data) obtained by either the first likelihood calculation unit 71 or the second likelihood calculation unit 72 is also transmitted to the likelihood obtaining unit 3A.

FIG. 9 shows a case where the apparatus includes two likelihood calculation units. However, the present embodiment should not be limited to this structure. The apparatus may include three or more likelihood calculation units.

The likelihood obtaining unit 3A receives the first likelihoods transmitted from the first likelihood calculation unit 71, the second likelihoods transmitted from the second likelihood calculation unit 72, the predicted posterior probability distribution (predicted posterior probability distribution data) transmitted from either the first likelihood calculation unit 71 or the second likelihood calculation unit 72 (or both of the first likelihood calculation unit 71 and the second likelihood calculation unit 72), and the prior probability distribution (prior probability distribution data) transmitted from the prior probability distribution output unit 5. The likelihood obtaining unit 3A selects a likelihood (likelihood data) from a plurality of likelihoods (in the case of FIG. 9, the first likelihood and the second likelihood) base on the prior probability distribution (prior probability distribution data), and then transmitted the selected likelihood (the selected likelihood data) to the posterior probability distribution estimation unit 4.

2.2 Operation of State Estimation System

The operation of the state estimation system 2000 with the above-described structure will now be described.

In the following, processing for tracking a yellow object whose size changes will be described as an example, like in the first embodiment.

Like in the first embodiment, the first observation (first observation data) is assumed to be an image signal (object detection image signal) indicating the result of detecting a yellow object with W0 in width and H0 in height. The first object detection unit 112 generates an image (detection image), in which a pixel value of a pixel is larger (a pixel value is set to a value indicating the higher degree of being yellow in the image area with W0 in width and H0 in height) as the degree of being yellow in an image area that includes the pixel and has a size closer to the size of the width W0 by the height H0 in the image obtained by the first video input unit 111 is higher.

The second observation (second observation data) is assumed to be an image signal (object detection image signal) indicating the result of detecting a yellow object with 2×W0 in width and 2×H0 in height. The second object detection unit 122 generates an image (detection image), in which a pixel value of a pixel is larger (a pixel value is set to a value indicating the higher degree of being yellow in the image area with 2×W0 in width and 2×H0 in height) as the degree of being yellow in an image area that includes the pixel and has a size closer to the size of the width 2×W0 by the height 2×H0 in the image obtained by the second video input unit 121 is higher. Processing at time t0:

First, processing at time t0 will be described.

At time t0, the initial state setting unit 6 transmits initial values for setting the initial state of a target to be tracked to the prior probability distribution output unit 5.

The prior probability distribution output unit 5 generates a set of samples (particles) $S_{t|t-1}$ (t=t0) representing the initial state of the target to be tracked based on the initial values received from the initial state setting unit 6.

Processing for generating the set of samples (particles) $S_{t|t-1}$ (t=t0) representing the initial state of the target to be tracked may be performed such that a set of particles representing all possible states are generated as a set of particles representing the initial state, for example.

Prior probability distribution (prior probability distribution data) at time t0 which is generated by the prior probability distribution output unit 5 is transmitted to the likelihood calculation unit 7, the likelihood obtaining unit 3A, and the posterior probability distribution estimation unit 4.

The first observation data (the detection result with respect to the yellow image area with W0 in width and H0 in height (the object detection image)) obtained by the first observation obtaining unit 11 of the observation obtaining unit 1 is transmitted to the first likelihood calculation unit 71 of the likelihood calculation unit 7.
The second observation data (the detection result with respect to the yellow image area with 2×W0 in width and 2×H0 in height (the object detection image)) obtained by the second observation obtaining unit 12 of the observation obtaining unit 1 is transmitted to the second likelihood calculation unit 72 of the likelihood calculation unit 7.

The first likelihood calculation unit 71 of the likelihood calculation unit 7 performs prediction processing based on the set of particles $s_{t-1|t-1}$ in accordance with the prior probability distribution (prior probability distribution data) at time t0 which is generated by the prior probability distribution output unit 5 to obtain a set of particles $s_{t|t-1}$ after prediction processing.

The likelihood calculation unit 71 then calculates a likelihood (a first likelihood) based on the set of particles $s_{t|t-1}$ after prediction processing and the first observation data (actual observation) transmitted from the first observation obtaining unit 11.

Note that the likelihood is set to the first observation data determined by the internal variables of each particle in the image area; that is, the likelihood is set to an integrated value of pixel values of pixels in the object detection image.

More specifically, for the i-th particle (1≤i≤M), the following is satisfied:

$$s_{t|t-1}^{(i)} = (X_t^{(i)}, Y_t^{(i)}, W_t^{(i)}, H_t^{(i)}).$$

Thus, the likelihood $w1a_t^{(i)}$ for the i-th particle is set to the integrated value of pixel values of pixels, in the object detection image, included in the image area that is centered at the position $(X_t^{(i)}, Y_t^{(i)})$ in the object detection image and has a size of $W_t^{(i)}$ in width and $H_t^{(i)}$ in height.

The likelihood $w1a_t$ (first likelihood) calculated by the first likelihood calculation unit 71 and the predicted probability distribution data (data regarding the set of particles $s_{t|t-1}$ after prediction processing) are transmitted to the likelihood obtaining unit 3A.

The second likelihood calculation unit 72 of the likelihood calculation unit 7 calculates likelihoods (second likelihoods) based on the set of particles $s_{t|t-1}$ after prediction processing, which is obtained by the first likelihood calculation unit 71, and the second observation data (actual observation) transmitted from the second observation obtaining unit 12.

Note that the likelihood is set to the second observation data determined by the internal variables of each particle in the image area; that is, the likelihood is set to an integrated value of pixel values of pixels in the object detection image.

More specifically, for the i-th particle the following is satisfied:

$$s_{t|t-1}^{(i)} = (X_t^{(i)}, Y_t^{(i)}, W_t^{(i)}, H_t^{(i)}).$$

Thus, the likelihood $w2a_t^{(i)}$ for the i-th particle is set to the integrated value of pixel values of pixels, in the object detection image, included in the image area that is centered at the position $(X_t^{(i)}, Y_t^{(i)})$ in the object detection image and has a size of $W_t^{(i)}$ in width and $H_t^{(i)}$ in height.

The likelihood $w2a_t$ (second likelihood) calculated by the second likelihood calculation unit 72 is transmitted to the likelihood obtaining unit 3A.

Until the target to be tracked is found (determined), the likelihood obtaining unit 3A refer to both the first observation data and the second observation data to determine which one of the first likelihood and the second likelihood to be transmitted. At time t0, as shown in FIG. 4, the detection result of the first observation data (object detection image) is more appropriate. Thus, the likelihood obtaining unit 3A selects the first likelihood, and then transmitted the selected first likelihood to the posterior probability distribution estimation unit 4.

The posterior probability distribution estimation unit 4 samples M particles, at the ratio proportional to the first likelihood $w1a_t^{(i)}$, without changing the total number of the particles (the particle $xa_t^{(i)}$ is sampled). Based on the distribution of the sampled M particles in the above processing, a set of samples (particles) $S_{t|t}$ generated in accordance with the posterior probability distribution $p(x_t|y_t)$ at time t0 is obtained such that $S_{t|t} = \{s_{t|t}^{(1)}, s_{t|t}^{(2)}, \ldots, s_{t|t}^{(M)}\}$ is satisfied.

An area R_pred_ave representing the average value $(X_{t|t-1}\_ave, Y_{t|t-1}\_ave, W_{t|t-1}\_ave, H_{t|t-1}\_ave)$ of particles in accordance with the predicted probability distribution (data regarding the set of $s_{t|t-1}$ after prediction processing), which is obtained in the above processing, is the same as the area R_pred_ave shown in FIG. 4.

Also, an area R_after_ave representing the average value $(X_{t|t}\_ave, Y_{t|t}\_ave, W_{t|t}\_ave, H_{t|t}\_ave)$ of the set of samples (particles) $S_{t|t}$ generated in accordance with the posterior probability distribution $p(x_t|y_t)$ at time t0, which is obtained in the above processing, is the same as the area R_after_ave shown in FIG. 4.

Note that variables $W_{t|t}\_ave$ and $H_{t|t}\_ave$ are assumed to be obtained in a manner that the following equations are satisfied:

$$W_{t|t}\_ave = 1.4 \times W0$$

$$H_{t|t}\_ave = 1.4 \times H0.$$

Processing at time t1:

Next, processing at time t1 will be described.

The first observation data (object detection image) at time t1, the second observation data (object detection image) at time t1, and the state of the object B1 in the image at time t1 are the same as those shown in FIG. 5.

At time t1, the prior probability distribution output unit 5 transmits the posterior probability distribution (posterior probability distribution data) at time t0 as prior probability distribution (prior probability distribution data) at time t1 to the likelihood calculation unit 7 and the likelihood obtaining unit 3A.

Also, the first observation data obtained by the first observation obtaining unit 11 of the observation obtaining unit 1 (the detection result with respect to the yellow image area with W0 in width and H0 in height (the object detection image)) is transmitted to the first likelihood calculation unit 71 of the likelihood calculation unit 7. The second observation data obtained by the second observation obtaining unit 12 of the observation obtaining unit 1 (the detection result with respect to the yellow image area with 2×W0 in width and 2×H0 in height (the object detection image)) is transmitted to the second likelihood calculation unit 72 of the likelihood calculation unit 7.

The first likelihood calculation unit 71 of the likelihood calculation unit 7 performs prediction processing based on the set of particles $s_{t-1|t-1}$ in accordance with the prior probability distribution (prior probability distribution data) at time t1 which is generated by the prior probability distribution output unit 5 to obtain a set of particles $s_{t|t-1}$ after prediction processing.

The first likelihood calculation unit 71 then calculates likelihoods (first likelihoods) based on the set of particles $s_{t|t-1}$ after prediction processing and the first observation data (actual observation) transmitted from the first observation obtaining unit 11.

Note that the likelihood is set to the first observation data determined by the internal variables of each particle in the image area; that is, the likelihood is set to an integrated value of pixel values of pixels in the object detection image.

More specifically, for the i-th particle (1≤i≤M), the following is satisfied:

$$s_{t|t-1}^{(i)} = (X_t^{(i)}, Y_t^{(i)}, W_t^{(i)}, H_t^{(i)}).$$

Thus, the likelihood $w1a_t^{(i)}$ for the i-th particle is set to the integrated value of pixel values of pixels, in the object detection image, included in the image area that is centered at the position $(X_t^{(i)}, Y_t^{(i)})$ in the object detection image and has a size of $w_t^{(i)}$ in width and $H_t^{(i)}$ in height.

The likelihood (first likelihood) $w1a_t$ calculated by the first likelihood calculation unit 71 and the predicted probability distribution data (data regarding the set of particles $s_{t|t-1}$ after prediction processing) are transmitted to the likelihood obtaining unit 3A.

The second likelihood calculation unit 72 of the likelihood calculation unit 7 calculates likelihoods (second likelihoods) based on the set of particles $s_{t|t-1}$ after prediction processing, which is obtained by the first likelihood calculation unit 71 and the second observation data (actual observation) transmitted from the second observation obtaining unit 12.

Note that the likelihood is set to the second observation data determined by the internal variables of each particle in the image area; that is, the likelihood is set to an integrated value of pixel values of pixels in the object detection image.

More specifically, for the i-th particle the following is satisfied:

$$s_{t|t-1}^{(i)} = (X_t^{(i)}, Y_t^{(i)}, W_t^{(i)}, H_t^{(i)}).$$

Thus, the likelihood $w2a_t^{(i)}$ for the i-th particle is set to the integrated value of pixel values of pixels, in the object detection image, included in the image area that is centered at the position $(X_t^{(i)}, Y_t^{(i)})$ in the object detection image and has a size of $W_t^{(i)}$ in width and $H_t^{(i)}$ in height.

The likelihood (second likelihood) $w2a_t$ calculated by the second likelihood calculation unit 72 is transmitted to the likelihood obtaining unit 3A.

The likelihood obtaining unit 3A, based on the prior probability distribution data transmitted from the prior probability distribution output unit 5, determines which data to be selected from the first likelihood and the second likelihood.

In other words, the likelihood obtaining unit 3A determines which data to be selected from the first likelihood and the second likelihood, based on the average value $(X_{t-1|t-1}\_ave, Y_{t-1|t-1}\_ave, W_{t-1|t-1}\_ave, H_{t-1|t-1}\_ave)$ of the set of samples (particles) $S_{t-1|t-1}$ generated in accordance with the prior probability distribution $p(x_{t-1}|y_{t-1})$ at time t1.

More specifically, the likelihood obtaining unit 3A compares the size of the image area representing the average value $(X_{t-1|t-1}\_ave, Y_{t-1|t-1}\_ave, W_{t-1|t-1}\_ave, H_{t-1|t-1}\_ave)$ of the set of particles $S_{t-1|t-1}$ with a predetermined threshold Th which is between the size (the width W0×the height H0) of the image area to be detected by the first observation obtaining unit 11 and the size (2×W0×2×H0) of the image area to be detected by the second observation obtaining unit 12, thereby determining which data to be selected from the first likelihood and the second likelihood. In the present embodiment, the threshold Th is set as Th=2×W0×H0. Furthermore, in the present embodiment, when the size of the image area representing the average value $(X_{t-1|t-1}\_ave, Y_{t-1|t-1}\_ave, W_{t-1|t-1}\_ave, H_{t-1|t-1}\_ave)$ of the set of particles $S_{t-1|t-1}$ is less than the threshold Th, the first likelihood is selected.

The size of the image area representing the average value $(X_{t-1|t-1}\_ave, Y_{t-1|t-1}\_ave, W_{t-1|t-1}\_ave, H_{t-1|t-1}\_ave)$ of the set of particles $S_{t-1|t-1}$ is as follows:

$$W_{t-1|t-1}\_ave = W_{t|t}\_ave = 1.4 \times W0$$

$$H_{t-1|t-1}\_ave = H_{t|t}\_ave = 1.4 \times H0.$$

Thus, the following is satisfied:

$$1.4 \times W0 \times 1.4 \times H0 = 1.96 \times W0 \times H0 < 2 \times W0 \times H0.$$

In this case, the size of the image area representing the average value $(X_{t-1|t-1}\_ave, Y_{t-1|t-1}\_ave, W_{t-1|t-1}\_ave, H_{t-1|t-1}\_ave)$ of the set of particles $S_{t-1|t-1}$ is less than the threshold Th (=2×W0×H0), and thus the likelihood obtaining unit 3A selects the first likelihood.

The selected first likelihood is then transmitted to the posterior probability distribution estimation unit 4.

The posterior probability distribution estimation unit 4 samples M particles, at the ratio proportional to the first likelihood $w1a_t^{(i)}$, without changing the total number of the particles (the particle $xa_t^{(i)}$ is sampled). Based on the distribution of the sampled M particles in the above processing, a set of samples (particles) $S_{t|t}$ generated in accordance with the posterior probability distribution $p(x_t|y_t)$ at time t1 is obtained such that $S_{t|t} = \{s_{t|t}^{(1)}, s_{t|t}^{(2)}, \ldots, s_{t|t}^{(M)}\}$ is satisfied.

Note that (1) the area R_before_ave representing the average value of particles in accordance with the prior probability distribution at time t1, and (2) the area R_pred_ave representing the average value $(X_{t|t-1}\_ave, Y_{t|t-1}\_ave, W_{t|t-1}\_ave, H_{t|t-1}\_ave)$ of particles in accordance with the predicted probability distribution (data regarding the set of $s_{t|t-1}$ after prediction processing), which is obtained in the above processing, are the same as those shown in FIG. 5.

The area R_after_ave representing the average value $(X_{t|t}\_ave, Y_{t|t}\_ave, W_{t|t}\_ave, H_{t|t}\_ave)$ of the set of samples (particles) $S_{t|t}$ generated in accordance with the posterior probability distribution $p(x_t|y_t)$ at time t1, which is obtained in the above processing, is the same as one shown in FIG. 5.

Note that variables $W_{t|t}\_ave$ and $H_{t|t}\_ave$ are assumed to be obtained in a manner that the following equations are satisfied:

$$W_{t|t}\_ave = 1.6 \times W0$$

$$H_{t|t}\_ave = 1.4 \times H0.$$

Processing at time t2:

Next, processing at time t2 will be described.

The first observation data (object detection image) at time t2, the second observation data (object detection image) at time t2, and the state of the object B2 in the image are the same as those shown in FIG. 7.

At time t2, the prior probability distribution output unit 5 transmits the posterior probability distribution (posterior probability distribution data) at time t1 as prior probability distribution (prior probability distribution data) at time t2 to the likelihood calculation unit 7 and the likelihood obtaining unit 3A.

Also, the first observation data obtained by the first observation obtaining unit 11 of the observation obtaining unit 1 (the detection result with respect to the yellow image area with W0 in width and H0 in height (the object detection image)) is transmitted to the first likelihood calculation unit 71 of the likelihood calculation unit 7. The second observation data obtained by the second observation obtaining unit 12 of the observation obtaining unit 1 (the detection result with respect to the yellow image area with 2×W0 in width and 2×H0 in height (the object detection image)) is transmitted to the second likelihood calculation unit 72 of the likelihood calculation unit 7.

The first likelihood calculation unit 71 of the likelihood calculation unit 7 performs prediction processing based on the set of particles $s_{t-1|t-1}$ in accordance with the prior probability distribution (prior probability distribution data) at time t2 which is generated by the prior probability distribution output unit 5 to obtain a set of particles $s_{t|t-1}$ after prediction processing.

The first likelihood calculation unit 71 then calculates likelihoods (first likelihoods) based on the set of particles $s_{t|t-1}$ after prediction processing and the first observation data (actual observation) transmitted from the first observation obtaining unit 11.

Note that the likelihood is set to the first observation data determined by the internal variables of each particle in the image area; that is, the likelihood is set to an integrated value of pixel values of pixels in the object detection image.

More specifically, for the i-th particle (1≤i≤M), the following is satisfied:

$$s_{t|t-1}^{(i)} = (X_t^{(i)}, Y_t^{(i)}, W_t^{(i)}, H_t^{(i)}).$$

Thus, the likelihood $w1a_t^{(i)}$ for the i-th particle is set to the integrated value of pixel values of pixels, in the object detection image, included in the image area that is centered at the position $(X_t^{(i)}, Y_t^{(i)})$ in the object detection image and has a size of $W_t^{(i)}$ in width and $H_t^{(i)}$ in height.

The likelihood (first likelihood) $w1a_t$ calculated by the first likelihood calculation unit 71 and the predicted probability distribution data (data regarding the set of particles $s_{t|t-1}$ after prediction processing) are transmitted to the likelihood obtaining unit 3A.

The second likelihood calculation unit 72 of the likelihood calculation unit 7 calculates likelihoods (second likelihoods) based on the set of particles $s_{t|t-1}$ after prediction processing, which is obtained by the first likelihood calculation unit 71, and the second observation data (actual observation) transmitted from the second observation obtaining unit 12.

Note that the likelihood is set to the second observation data determined by the internal variables of each particle in the image area; that is, the likelihood is set to an integrated value of pixel values of pixels in the object detection image.

More specifically, for the i-th particle (1≤i≤M), the following is satisfied: $s_{t|t-1}^{(i)} = (X_t^{(i)}, Y_t^{(i)}, W_t^{(i)}, H_t^{(i)})$. Thus, the likelihood $w2a_t^{(i)}$ for the i-th particle is set to the integrated value of pixel values of pixels, in the object detection image, included in the image area that is centered at the position $(X_t^{(i)}, Y_t^{(i)})$ in the object detection image and has a size of $W_t^{(i)}$ in width and $H_t^{(i)}$ in height.

The likelihood $w2a_t$ calculated by the second likelihood calculation unit 72 is transmitted to the likelihood obtaining unit 3A.

The likelihood obtaining unit 3A, based on the prior probability distribution data transmitted from the prior probability distribution output unit 5, determines which data to be selected from the first likelihood and the second likelihood.

In other words the likelihood obtaining unit 3A determines which data to be selected from the first likelihood and the second likelihood, based on the average value $(X_{t-1|t-1}\_ave, Y_{t-1|t-1}\_ave, W_{t-1|t-1}\_ave, H_{t-1|t-1}\_ave)$ of the set of samples (particles) $S_{t-1|t-1}$ generated in accordance with the prior probability distribution $p(x_{t-1}|y_{t-1})$ at time t2.

More specifically, the size of the image area representing the average value $(X_{t-1|t-1}\_ave, Y_{t-1|t-1}\_ave, W_{t-1|t-1}\_ave, H_{t-1|t-1}\_ave)$ of the set of particles $S_{t-1|t-1}$ is as follows:

$$W_{t-1|t-1}\_ave = W_{t|t}\_ave = 1.6 \times W0$$

$$H_{t-1|t-1}\_ave = H_{t|t}\_ave = 1.4 \times H0.$$

Thus, the following is satisfied:

$$1.6 \times W0 \times 1.4 \times H0 = 2.24 \times W0 \times H0 > 2 \times W0 \times H0.$$

In this case, the size of the image area representing the average value $(X_{t-1|t-1}\_ave, Y_{t-1|t-1}\_ave, W_{t-1|t-1}\_ave, H_{t-1|t-1}\_ave)$ of the set of particles $S_{t-1|t-1}$ is greater than the threshold Th (=2×W0×H0), and thus the likelihood obtaining unit 3A selects the second likelihood.

The selected second likelihood is then transmitted to the posterior probability distribution estimation unit 4.

The posterior probability distribution estimation unit 4 samples M particles, at the ratio proportional to the likelihood $w2a_t^{(i)}$, without changing the total number of the particles (the particle $xa_t^{(i)}$ is sampled). Based on the distribution of the sampled M particles in the above processing, a set of samples (particles) $S_{t|t}$ generated in accordance with the posterior probability distribution $p(x_t|y_t)$ at time t2 is obtained such that $S_{t|t} = \{s_{t|t}^{(1)}, s_{t|t}^{(2)}, \ldots, s_{t|t}^{(M)}\}$ is satisfied.

Note that (1) the area R_before_ave representing the average value of particles in accordance with the prior probability distribution at time t2, and (2) the area R_pred_ave representing the average value $(X_{t|t-1}\_ave, Y_{t|t-1}\_ave, W_{t|t-1}\_ave, H_{t|t-1}\_ave)$ of particles in accordance with the predicted probability distribution (data regarding the set of $S_{t|t-1}$ after prediction processing), which is obtained in the above processing, are the same as those shown in FIG. 7.

The area R_after_ave representing the average value $(X_{t|t}\_ave, Y_{t|t}\_ave, W_{t|t}\_ave, H_{t|t}\_ave)$ of the set of samples (particles) $S_{t|t}$ generated in accordance with the posterior probability distribution $p(x_t|y_t)$ at time t2, which is obtained in the above processing, is the same as one shown in FIG. 7.

Note that variables $W_{t|t}\_ave$ and $H_{t|t}\_ave$ are assumed to be obtained in a manner that the following equations are satisfied:

$$W_{t|t}\_ave = 2.3 \times W0$$

$$H_{t|t}\_ave = 1.6 \times H0.$$

Processing at time t3:

Next, processing at time t3 will be described.

The first observation data (object detection image) at time t3, the second observation data (object detection image) at time t3, and the state of the object B2 in the image at time t3 are the same as those shown in FIG. 8.

At time t3, the prior probability distribution output unit 5 transmits the posterior probability distribution (posterior probability distribution data) at time t2 as prior probability distribution (prior probability distribution data) at time t3 to the likelihood calculation unit 7 and the likelihood obtaining unit 3A.

Also, the first observation data obtained by the first observation obtaining unit 11 of the observation obtaining unit 1 (the detection result with respect to the yellow image area with W0 in width and H0 in height (the object detection image)) is transmitted to the first likelihood calculation unit 71 of the likelihood calculation unit 7. The second observation data obtained by the second observation obtaining unit 12 of the observation obtaining unit 1 (the detection result with respect to the yellow image area with 2×W0 in width and 2×H0 in height (the object detection image)) is transmitted to the second likelihood calculation unit 72 of the likelihood calculation unit 7.

The first likelihood calculation unit 71 of the likelihood calculation unit 7 performs prediction processing based on the set of particles $s_{t-1|t-1}$ in accordance with the prior probability distribution (prior probability distribution data) at time t3 which is generated by the prior probability distribution output unit 5 to obtain a set of particles $s_{t|t}$ after prediction processing.

The first likelihood calculation unit 71 then calculates likelihoods (first likelihoods) based on the set of particles $s_{t|t-1}$ after prediction processing and the first observation data (actual observation) transmitted from the first observation obtaining unit 11.

Note that the likelihood is set to the first observation data determined by the internal variables of each particle in the image area; that is, the likelihood is set to an integrated value of pixel values of pixels in the object detection image.

More specifically, for the i-th particle (1≤i≤M), the following is satisfied:

$$s_{t|t-1}^{(i)} = (X_t^{(i)}, Y_t^{(i)}, W_t^{(i)}, H_t^{(i)}).$$

Thus, the likelihood $w1a_t^{(i)}$ for the i-th particle is set to the integrated value of pixel values of pixels, in the object detection image, included in the image area that is centered at the position $(X_t^{(i)}, Y_t^{(i)})$ in the object detection image and has a size of $W_t^{(i)}$ in width and $H_t^{(i)}$ in height.

The likelihood (first likelihood) w1*at* calculated by the first likelihood calculation unit 71 and the predicted probability distribution data (data regarding the set of particles $s_{t|t-1}$ after prediction processing) are transmitted to the likelihood obtaining unit 3A.

The second likelihood calculation unit 72 of the likelihood calculation unit 7 calculates likelihoods (second likelihoods) based on the set of particles $s_{t|t-1}$ after prediction processing, which is obtained by the first likelihood calculation unit 71, and the second observation data (actual observation) transmitted from the second observation obtaining unit 12.

Note that the likelihood is set to the second observation data determined by the internal variables of each particle in the image area; that is, the likelihood is set to an integrated value of pixel values of pixels in the object detection image.

More specifically, for the i-th particle (1≤i≤M), the following is satisfied:

$$s_{t|t-1}^{(i)} = (X_t^{(i)}, Y_t^{(i)}, W_t^{(i)}, H_t^{(i)}).$$

Thus, the likelihood $w2a_t^{(i)}$ for the i-th particle is set to the integrated value of pixel values of pixels, in the object detection image, included in the image area that is centered at the position $(X_t^{(i)}, Y_t^{(i)})$ in the object detection image and has a size of $W_t^{(i)}$ in width and $H_t^{(i)}$ in height.

The likelihood $w2a_t$ (second likelihood) calculated by the second likelihood calculation unit 72 is transmitted to the likelihood obtaining unit 3A.

The likelihood obtaining unit 3A determines which one of the first likelihood and the second likelihood to be selected, based on the prior probability distribution data transmitted from the prior probability distribution output unit 5.

In other words, the likelihood obtaining unit 3A determines which data to be selected from the first likelihood and the second likelihood, based on the average value $(X_{t-1|t-1}\_ave, Y_{t-1|t-1}\_ave, W_{t-1|t-1}\_ave, H_{t-1|t-1}\_ave)$ of the set of samples (particles) $S_{t-1|t-1}$ generated in accordance with the prior probability distribution $p(x_{t-1}|y_{t-1})$ at time t3.

More specifically, the size of the image area representing the average value $(X_{t-1|t-1}\_ave, Y_{t-1|t-1}\_ave, W_{t-1|t-1}\_ave, H_{t-1|t-1}\_ave)$ of the set of particles $S_{t-1|t-1}$ is as follows:

$$W_{t-1|t-1}\_ave = W_{t|t}\_ave = 2.3 \times W0$$

$$H_{t-1|t-1}\_ave = H_{t|t}\_ave = 1.6 \times H0.$$

Thus, the following is satisfied:

$$2.3 \times W0 \times 1.6 \times H0 = 3.68 \times W0 \times H0 > 2 \times W0 \times H0$$

In this case, the size of the image area representing the average value $(X_{t-1|t-1}\_ave, Y_{t-1|t-1}\_ave, W_{t-1|t-1}\_ave, H_{t-1|t-1}\_ave)$ of the set of particles $S_{t-1|t-1}$ is greater than the threshold Th $(=2\times W0\times H0)$, and thus the likelihood obtaining unit 3A selects the second likelihood.

The selected second likelihood is then transmitted to the posterior probability distribution estimation unit 4.

The posterior probability distribution estimation unit 4 samples M particles, at the ratio proportional to the second likelihood $w2a_t^{(i)}$, without changing the total number of the particles (the particle $xa_t^{(i)}$ is sampled). Based on the distribution of the sampled M particles in the above processing, a set of samples (particles) $S_{t|t}$ generated in accordance with the posterior probability distribution $p(x_t|y_t)$ at time t3 is obtained such that $S_{t|t} = \{s_{t|t}^{(1)}, s_{t|t}^{(2)}, \ldots, s_{t|t}^{(M)}\}$ is satisfied.

Note that (1) the area R_before_ave representing the average value of particles in accordance with the prior probability distribution at time t3, and (2) the area R_pred_ave representing the average value $(X_{t|t-1}\_ave, Y_{t|t-1}\_ave, W_{t|t-1}\_ave, H_{t|t-1}\_ave)$ of particles in accordance with the predicted probability distribution (data regarding the set of $s_{t|t-1}$ after prediction processing), which is obtained in the above processing, are the same as those shown in FIG. 8.

The area R_after_ave representing the average value $(X_{t|t}\_ave, Y_{t|t}\_ave, W_{t|t}\_ave, H_{t|t}\_ave)$ of the set of samples (particles) $S_{t|t}$ generated in accordance with the posterior probability distribution $p(x_t|y_t)$ at time t3, which is obtained in the above processing, is the same as one shown in FIG. 8.

Continuing the above processing enables the processing for tracking the object to be performed by the state estimation system 2000.

In the state estimation system 2000, the observation obtaining unit 1 obtains a plurality of observations (observation data), and the likelihood calculation unit 7 calculates likelihoods each of which corresponds to one of the plurality of observations. The state estimation system 2000 then selects more appropriate likelihood from the plurality of likelihoods calculated by the likelihood calculation unit 7 depending on the state of the target to be tracked (in the present embodiment, depending on the size of the target). The state estimation system 2000 then performs resampling using the selected likelihood. Thus, the state estimation system 2000 can obtain appropriate posterior probability distribution data even when the state of the target to be tracked changes (in the present embodiment, even when the size of the object changes). As a result, the state estimation system 2000 appropriately estimates the internal state of an observation target, and thus precisely tracks, for example, an object whose size varies in moving images or a plurality of objects with different sizes in moving images.

Modification

A modification of the second embodiment will now be described.

A state estimation system according to this modification has the same structure as the state estimation system 2000 according to the second embodiment.

In the state estimation system 2000 of the second embodiment, the likelihood obtaining unit 3A selects one of the first likelihood and the second likelihood, whereas in this modification, the likelihood obtaining unit 3A obtains a synthesized likelihood that is obtained by synthesizing the first likelihood and the second likelihood, and transmits the obtained synthesized likelihood to the posterior probability distribution estimation unit 4. Only in this aspect described above, this modification differs from the second embodiment.

The portion specific to this modification will now be described.

The likelihood obtaining unit 3A determines a ratio to synthesize the first likelihood and the second likelihood based on the prior probability distribution data transmitted from the prior probability distribution output unit 5.

More specifically, the likelihood obtaining unit 3A obtains an interior-division ratio α as follows:

$$\alpha = (A1-D1)/(D2-D1)$$

$$0 \leq \alpha \leq 1$$

where the size of an image area representing the average value ($X_{t-1|t-1}$_ave, $Y_{t-1|t-1}$_ave, $W_{t-1|t-1}$_ave, $H_{t-1|t-1}$_ave) of the set of particles $S_{t-1|t-1}$ is A1, the size (the width W0×the height H0) of an image area to be detected by the first observation obtaining unit 11 is D1, the size (2×W0×2×H0) of an image area to be detected by the second observation obtaining unit 12 is D2, and D1<A1<D2 is satisfied. The likelihood obtaining unit 3A calculates the synthesized likelihood as (synthesized likelihood)=(first likelihood)×(1−α)+ (second likelihood)×α. The likelihood obtaining unit 3A then transmits the calculated synthesized likelihood to the posterior probability distribution estimation unit 4.

As described above, the state estimation system of the present modification performs resampling using the synthesized likelihood obtained by synthesizing, with weighting, the first likelihood and the second likelihood, and thus can obtain appropriate posterior probability distribution data even when the state of an object to be tracked changes abruptly. In other words, when the state of the object to be tracked changes abruptly, performing a process with selecting one from a plurality of observations causes posterior distribution data that is to be obtained to change abruptly in switching the selected observation, thereby resulting in an unnatural tracking process. In contrast, the state estimation system of this modification performs a process with the synthesized likelihood obtained by synthesizing, with weighting, the first likelihood and the second likelihood, and thus appropriately prevents posterior distribution data that is to be obtained from changing abruptly even when such an abrupt change as described above occurs. This enables the state estimation system of the present modification to perform a natural tracking process.

In the above, a case when the synthesized likelihood is calculated through interior-division processing is described. However, the present invention should not be limited to such a case. The synthesized likelihood may be calculated through other weighting, such as exterior-division processing.

Alternatively, the synthesized likelihood may be obtained by using a nonlinear function, such as a non-linear function with the width and height of an image area representing the average value ($X_{t-1|t-1}$_ave, $Y_{t-1|t-1}$_ave, $W_{t-1|t-1}$_ave, $H_{t-1|t-1}$_ave) of the set of particles $S_{t-1|t-1}$ as its variables.

In the above, a case when the likelihood calculation unit 7 obtains two likelihoods is described. However, the present invention should not be limited to such a case. The likelihood calculation unit 7 may obtains three or more likelihoods.

OTHER EMBODIMENTS

In the above embodiments (including the modification), a case when the threshold Th is set based on the size of an image area in a process for selecting one from the first observation data and the second observation data or a process for selecting one from the first likelihood and the second likelihood is described. However, the present invention should not be limited to such a case. For example, when the aspect ratio of the height H and width W of an object to be tracked is a fixed value, a threshold is set based on the width or the height, and a threshold process is performed in which the width or the height of an image area defined by the average value ($X_{t-1|t-1}$_ave, $Y_{t-1|t-1}$_ave, $W_{t-1|t-1}$_ave, $H_{t-1|t-1}$_ave) of the set of particles $S_{t-1|t-1}$ is compared with the threshold value. Through such a threshold process, a selection process to select one from the first observation data and the second observation data or a process to select one from the first likelihood and the second likelihood may be performed.

For example, when the aspect ratio of the height H and width W of an object to be tracked is a fixed aspect ratio of the height H to the width W at 1:2 (H:W=1:2), the first observation data is an object detection image that is most sensitive to an object with 16 pixels in width in detection, and the second observation data is an object detection image that is most sensitive to an object with 32 pixels in width in detection, the threshold value is, for example, set to "24" that is an intermediate value of "16" and "32".

(1) If W≤24, the first observation data is then selected.
(2) If W>24, the second observation data is selected.

As described above, the selection process for the first observation data or the selection process for the second observation data may be performed.

(1) If W≤24, the first likelihood is selected.
(2) If W>24, the second likelihood is selected.

As described above, the selection process for the first likelihood or the selection process for the second likelihood may be performed.

In the above embodiments (including the modification), a case when the state indicated by particles is determined by using the state vector (X, Y, W, H) representing a rectangular area that is centered at the particle's center position (X, Y) and has W in width and H in height, and processes for particles are performed using the state vector (X, Y, W, H) is described. However, the present invention should not be limited to such a case. For example, the state indicated by particles may be determined by using the state vector (X, Y, A, B) representing a elliptic area that is centered at the particle's center position (X,Y) and has the major axis of 2A and the minor axis of 2B, and processes for particles may be performed using the state vector (X, Y, A, B).

In the above embodiments (including the modification), the likelihood is set to the first observation data determined by the internal variables of each particle in the image area; that is, the likelihood is set to an integrated value of pixel values of pixels in the object detection image. In the above embodiments (including the modification), such a case is described. However, the present invention should not be limited to such a case. For example, the likelihood may be set to the first observation data in an image area (e.g., an image area that is larger, by a size corresponding to a certain ratio, than the image area whose size is W×H) set based on the internal variables of each particle in the image area; that is, the likelihood may be set to an integrated value of pixel values of pixels in the object detection image, a weighted integrated value (an integrated value obtained by integrating values weighted with a distance from the center coordinate of particles), an average value, or a weighted average value (an average value of values weighted with a distance from the center coordinate of particles).

In the above embodiments (including the modification), a case when an observation is one sensitive to a yellow object. However, the present invention should not be limited to such a case. For example, the present invention may employ a plurality of observations for detecting a plurality of objects with different sizes by an object detection apparatus that uses the neural network technology. In this case, in the observation obtaining unit 1, an detector with the neural network technology receives an image transmitted from a camera, and then outputs a detection signal that forms a grayscale image as a detection result. The resulting image is input to the observation selecting unit 2 or the likelihood calculation unit 7. In a process for calculating a likelihood, an area representing the state vector (X, Y, W, H) of particles is extracted, and then the likelihood may be calculated by adding all pixel values of pixels included in the extracted area in the grayscale image.

In the above embodiments (including the modification), a case when an object whose size changes is tracked is described. However, the present invention should not be limited to such a case. For example, the state estimation system may perform a process for tracking a plurality of objects with their sizes changed. In this case, for each image area that a plurality of objects to be tracked occupy, a process for selecting one from the first observation data and the second observation data or a process for selecting one from the first likelihood and the second likelihood may be performed, and then the same processing as described above may be performed.

In the above embodiments (including the modification), a case when a yellow object is to be tracked is described. However, the present invention should not be limited to such a case. For example, an object to be tracked may have other characteristics.

For tracking a yellow object, for example, the yellow degree may be detected as $Ye=(255-B)\times R\times G/(1+R+G+B)$ where the R component value (8-bit data), G component value (8-bit data), and B component value of each pixel in an image (video) obtained by the first video input unit 111 or the second video input unit 121 are denoted as R, G, and B, respectively. Then, the detection result may be set as an object detection image.

For tracking another colored object, processing for extracting the color component that is the same as that of the colored object may be performed in the same manner as the above, and then the detection result may be set as an object detection image.

In the above embodiments (including the modification), as shown in FIG. 3, the first observation obtaining unit 11 and the second observation obtaining unit 12 each includes the corresponding video input units (the first video input unit 111 and the second video input unit 121, respectively). However, the present invention should not be limited to such a structure. For example, the observation obtaining unit 1 may include one video input unit, and the output of the video input unit may be transmitted to the first object detection unit 112 and the second object detection unit 122.

Figure 10:
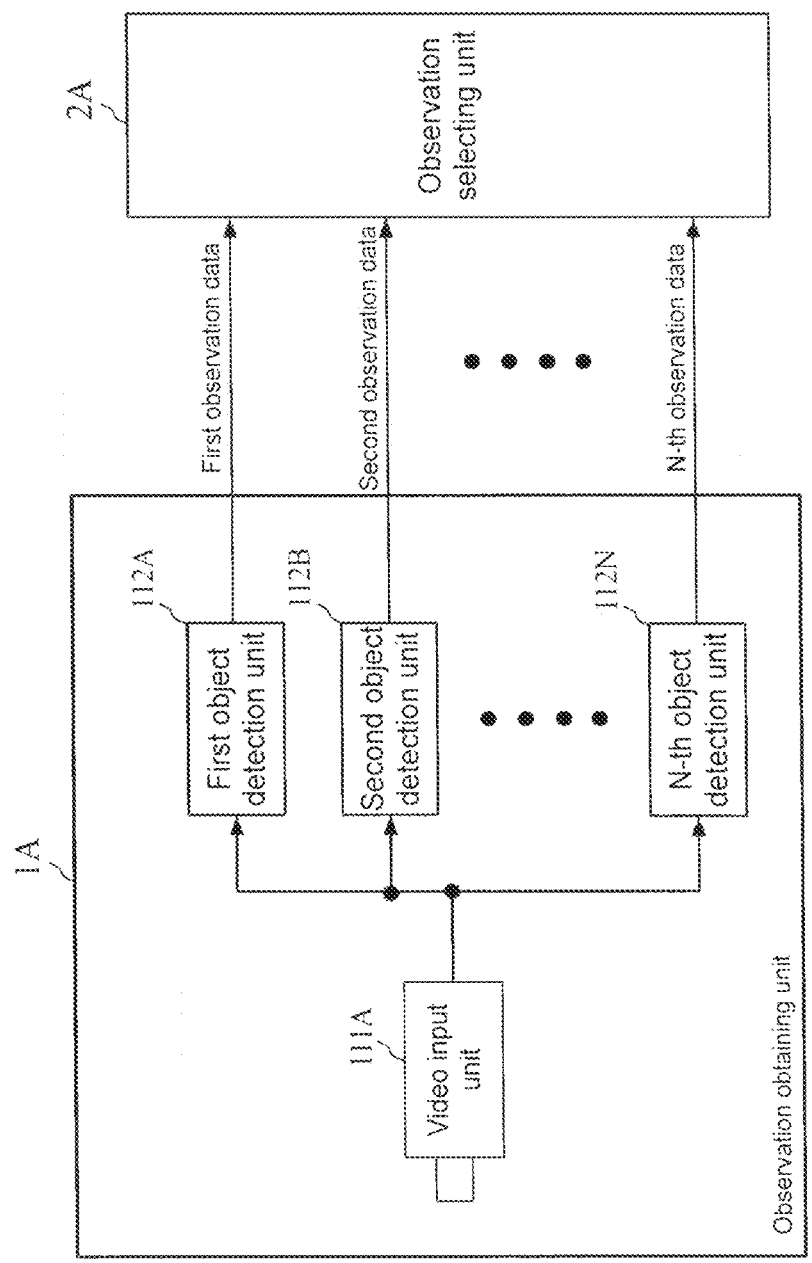
FIG. 10 is a schematic block diagram of an observation obtaining unit 1A and an observation selecting unit 2A according to another embodiment.

Furthermore, in the state estimation system of the first embodiment, the observation obtaining unit 1 may be replaced with the observation obtaining unit 1A shown in FIG. 10, and the observation selecting unit 2 may be replaced with the observation selecting unit 2A shown in FIG. 10.

In this case, as shown in FIG. 10, the observation obtaining unit 1A includes a video input unit and N object detection units. More specifically, the observation obtaining unit 1A includes a video input unit 111A, the first object detection unit 112A, the second object detection unit 112B, . . . , and the N-th object detection unit 112N.

The first object detection unit 112A, the second object detection unit 112B, . . . , the N-th object detection unit 112N each receive moving images (moving image signal) obtained by the video input unit 111A, obtain first to N-th object detection images from the received moving images (moving image signal), and transmit the obtained first to N-th object detection images (first to N-th observation data) to the observation selecting unit 2A.

The observation selecting unit 2 selects one from the plurality of observations (observation data), that is to say, from the first to N-th object detection images (the first to N-th observation data), based on the prior probability distribution (the prior probability distribution data) transmitted from the prior probability distribution output unit 5.

Subsequent processing is the same as in the first embodiment. In this manner, using a plurality of pieces of observation data (e.g., a plurality of object detection images), the same processing as in the first embodiment may be performed.

Figure 11:
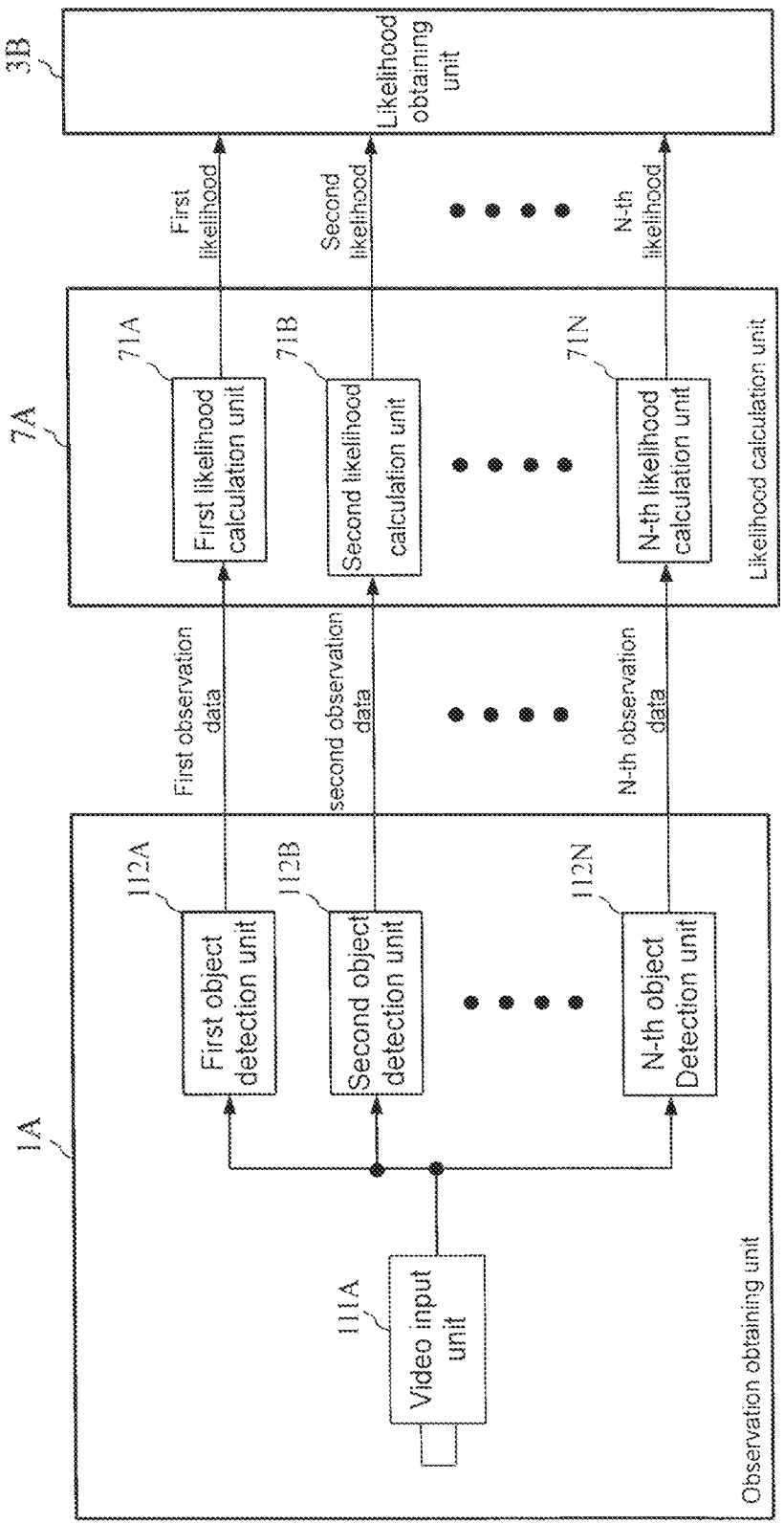
FIG. 11 is a schematic block diagram of an observation obtaining unit 1A, a likelihood calculation unit 7A, and a likelihood obtaining unit 3B according to the other embodiment.

In the state estimation system of the second embodiment, the observation obtaining unit 1 may be replaced with a observation obtaining unit 1A shown in FIG. 11, and the likelihood calculation unit 7 may be replaced with a likelihood calculation unit 7A shown in FIG. 11, and furthermore the likelihood obtaining unit 3A may be replaced with a likelihood obtaining unit 3B shown in FIG. 11.

In this case, as shown in FIG. 11, the observation obtaining unit 1A includes a video input unit and N object detection units. More specifically, the observation obtaining unit 1A includes a video input unit 111A, a first object detection unit 112A, a second object detection unit 112B, . . . , and an N-th object detection unit 112N.

The first object detection unit 112A, the second object detection unit 112B, . . . , the N-th object detection unit 112N each receive moving images (moving image signal) obtained by the video input unit 111A, obtain first to N-th object detection images from the received moving images (moving image signal), and transmit the obtained first to N-th object detection images (first to N-th observation data) to the likelihood calculation unit 7A.

As shown in FIG. 11, the likelihood calculation unit 7A includes a first likelihood calculation unit 71A, a second likelihood calculation unit 71B, . . . , an N-th likelihood calculation unit 71N.

The first likelihood calculation unit 71A, the second likelihood calculation unit 71B, . . . , the N-th likelihood calculation unit 71N of the likelihood calculation unit 7A respectively receive the first to the N-th object detection images (the first to the N-th observation data), perform the same processing as described in the above embodiment (processing similar to that performed in the first likelihood calculation unit 71 or the like as described in the above embodiment) to obtain a first to an N-th likelihood (first to N-th likelihood data). Then, the first likelihood calculation unit 71A, the second likelihood calculation unit 71B, . . . , the N-th likelihood calculation unit 71N each transmit the obtained first to N-th likelihoods (the first to the N-th likelihood data) to the likelihood obtaining unit 3B.

The likelihood obtaining unit 3B selects one likelihood (likelihood data) from the plurality of likelihoods (the first to N-th likelihoods) based on the prior probability distribution transmitted from the prior probability distribution output unit 5.

Subsequent processing is the same as in the second embodiment. In this manner, using a plurality of pieces of observation data (e.g., a plurality of object detection images) or the plurality of likelihoods (likelihood data), the same processing as in the second embodiment may be performed.

Figure 12:
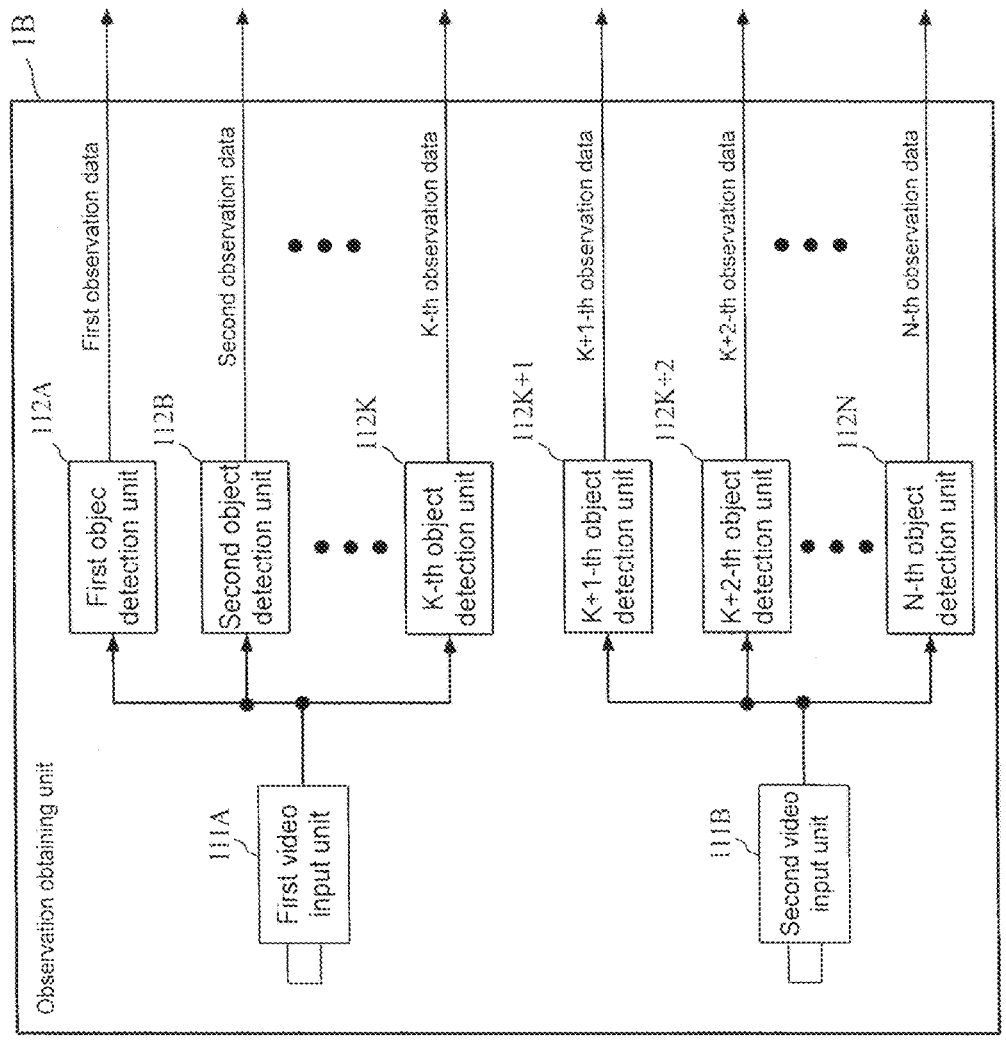
FIG. 12 is a schematic block diagram of an observation obtaining unit 1B according to the other embodiment.

In the structures described in the above embodiments (including the modification) or shown in FIGS. 10 and 11, the observation obtaining unit (1, A) may be replaced with an observation obtaining unit 1B shown in FIG. 12.

As shown in FIG. 12, the observation obtaining unit 1B includes two video input units (a first video input unit 111A and a second video input unit 111B) and N object detection units.

As shown in FIG. 12, the output of the first video input unit 111A is transmitted to the first to K-th object detection units, and the output of the second video input unit 111B is transmitted to the K+1-th to N-th object detection units.

In this manner, using a plurality of video input units and the plurality of object detection units, the same processing with a plurality of pieces of objection data (e.g., a plurality of object detection images) as in the above embodiment may be performed.

It should be noted that the number of video input units may be different from the number of object detection units, as shown in FIG. 12.

As described above, in the state estimation system, using a plurality of observation (a plurality of pieces of observation data) and/or a plurality of likelihoods (a plurality of pieces of likelihood data), the same processing as described in the above embodiments (including the modification) is performed. This enables the state estimation system to perform more accurate state estimation (e.g., processing for tracking object(s)). In the state estimation system, for example, for performing object tracking processing, the first to N-th object detection units each obtain the detection results (object detection images) of objects with different sizes. The state estimation system then performs processing with the detection results (object detection images), thereby allowing for processing for tracking object(s) with higher accuracy.

In the state estimation system, for example, for performing object tracking processing, the first to N-th object detection units each obtain the detection results (object detection images) of objects with different sizes. The state estimation system then obtains a plurality of likelihoods using the detection results (object detection images), and performs processing with the obtained likelihoods, thereby allowing for processing for tracking object(s) with higher accuracy.

Furthermore, the state estimation system calculates a synthesized likelihood through interior-division processing with the obtained plurality of likelihoods in the same manner as described in the second embodiment, and performs the same processing as in the second embodiment, thereby allowing for processing for tracking object(s) with higher accuracy.

Each block of the state estimation system described in the above embodiment may be formed using a single chip with a semiconductor device, such as an LSI (large-scale integration) device, or some or all of the blocks of the state estimation system may be formed using a single chip.

Although LSI is used as the semiconductor device technology, the technology may be an IC (integrated circuit), a system LSI, a super LSI, or an ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

Further, if any circuit integration technology that can replace LSI emerges as an advancement of the semiconductor technology or as a derivative of the semiconductor technology, the technology may be used to integrate the functional blocks. Biotechnology is potentially applicable.

All or part of the processes performed by the functional blocks described in the above embodiment may be implemented using programs. All or part of the processes performed by the functional blocks described in the above embodiment may be implemented by a central processing unit (CPU) in a computer. The programs for these processes may be stored in a storage device, such as a hard disk or a ROM, and may be executed from the ROM or be read into a RAM and then executed.

The processes described in the above embodiment may be implemented by using either hardware or software (including use of an operating system (OS), middleware, or a predetermined library), or may be implemented using both software and hardware.

The processes described in the above embodiment may not be performed in the order specified in the above embodiment.

The order in which the processes are performed may be changed without departing from the scope and the spirit of the invention.

The present invention may also include a computer program enabling a computer to implement the method described in the above embodiment and a computer readable recording medium on which such a program is recorded. The computer readable recording medium may be, for example, a flexible disk, a hard disk, a CD-ROM, an MO, a DVD, a DVD-ROM, a DVD-RAM, a large-capacity DVD, a next-generation DVD, or a semiconductor memory.

The computer program may not be recorded on the recording medium but may be transmitted with an electric communication line, a radio or cable communication line, or a network such as the Internet.

The specific structures described in the above embodiment of the present invention are mere examples, and may be changed and modified variously without departing from the scope and the spirit of the invention.

REFERENCE SIGNS LIST 1000,2000 state estimation system
1 observation obtaining unit
11 first observation obtaining unit
12 second observation obtaining unit
2 observation selecting unit
3,3A likelihood obtaining unit
4 posterior probability distribution estimation unit
5 prior probability distribution output unit
6 initial state setting unit
7 likelihood calculation unit
71 first likelihood calculation unit
72 second likelihood calculation unit

The invention claimed is:

1. A state estimation apparatus for estimating a state of a target object in moving images of an observable event, the state estimation apparatus comprising:
observation obtaining circuitry configured to obtain, at predetermined time intervals, a plurality of pieces of observation data obtained from the observable event, each of which is one of a plurality of image-feature-quantity extracted images obtained by extracting image feature quantity for the target object from one of a plurality of moving images obtained by a plurality of cameras at a time t;
observation selecting circuitry configured to select a piece of observation data from the plurality of pieces of observation data, the observation data being obtained at said time t by the observation obtaining circuitry, based on posterior probability distribution data regarding the state of the target object, the posterior probability distribution data being obtained at a preceding time t−1, the selected piece of observation data being the image-feature-quantity extracted image obtained from the moving images obtained by a camera among the plurality of cameras at said time t;
likelihood obtaining circuitry configured to obtain likelihood data based on the observation data selected by the observation selecting circuitry and predicted probability distribution data regarding the state of the target object, the predicted probability distribution data being obtained by performing prediction processing using the posterior probability distribution data;
posterior probability distribution estimation circuitry configured to estimate posterior probability distribution data representing a state of the observable event based on the predicted probability distribution data obtained by the likelihood obtaining circuitry and the likelihood data;
prior probability distribution output circuitry configured to output prior probability distribution data based on the posterior probability distribution data estimated by the posterior probability distribution estimation circuitry as prior probability distribution data at a next time t+1; and
circuitry configured to estimate the state of the target object in the moving images of the observable event based on the posterior probability distribution data estimated by the posterior probability distribution estimation circuitry.

2. The state estimation apparatus according to claim 1, wherein
the observation selecting circuitry, the likelihood obtaining circuitry, the posterior probability distribution estimation circuitry, and the prior probability distribution output circuitry perform processing using a particle filter.

3. A state estimation apparatus for estimating a state of a target object in moving images of an observable event, the state estimation apparatus comprising:
observation obtaining circuitry configured to obtain, at predetermined time intervals, a plurality of pieces of observation data obtained from the observable event, each of which is one of a plurality of image-feature-quantity extracted images obtained by extracting image feature quantity for the target object from one of a plurality of moving images obtained by a plurality of cameras at a time t;
likelihood calculation circuitry configured to obtain predicted probability distribution data regarding the state of the target object, the predicted probability distribution data being obtained by performing prediction processing using the posterior probability distribution data obtained at the preceding time t−1 and to calculate, using the predicted probability distribution data, likelihood data independently for each of the plurality of pieces of observation data that the observation obtaining circuitry obtains at said time t, the plurality of pieces of observation data each being the image-feature-quantity extracted image obtained from the moving images obtained by a camera among the plurality of cameras at said time t;
likelihood obtaining circuitry configured to derive a piece of likelihood data based on the plurality of pieces of likelihood data calculated, for each of the plurality of pieces of observation data, by the likelihood calculation circuitry and obtain the derived likelihood data as determined likelihood data;
posterior probability distribution estimation circuitry configured to estimate posterior probability distribution data representing a state of the observable event based on the predicted probability distribution data and the determined likelihood data;
prior probability distribution output circuitry configured to output prior probability distribution data based on the posterior probability distribution data estimated by the posterior probability distribution estimation circuitry as prior probability distribution data at a next time t+1; and
circuitry configured to estimate the state of the target object in the moving images of the observable event based on the posterior probability distribution data estimated by the posterior probability distribution estimation circuitry.

4. The state estimation apparatus according to claim 3, wherein the likelihood obtaining circuitry obtains a piece of likelihood data selected from the plurality of pieces of likelihood data as the determined likelihood data.

5. The state estimation apparatus according to claim 3, wherein
the likelihood obtaining circuitry obtains a piece of likelihood data derived by adding, with weighting, the plurality of pieces of likelihood data as the determined likelihood data.

6. The state estimation apparatus according to claim 5, wherein
the likelihood calculation circuitry, the likelihood obtaining circuitry, the posterior probability distribution estimation circuitry, and the prior probability distribution output circuitry perform processing using a particle filter, and the weighted coefficient of the likelihood data is represented using a function of particles representing an internal state.

7. The state estimation apparatus according to claim 3, wherein
the likelihood calculation circuitry, the likelihood obtaining circuitry, the posterior probability distribution estimation circuitry, and the prior probability distribution output circuitry perform processing using a particle filter.

8. A state estimation method for estimating a state of a target object in moving images of an observable event, the state estimation method comprising:
obtaining, at predetermined time intervals, a plurality of pieces of observation data obtained from the observable event, each of which is one of a plurality of image-feature-quantity extracted images obtained by extracting image feature quantity for the target object from one of a plurality of moving images obtained by a plurality of cameras at a time t;
selecting a piece of observation data from the plurality of pieces of observation data the observation data being obtained at said time t by the step of obtaining the plurality of pieces of observation data, based on posterior probability distribution data regarding the state of the target object, the posterior probability distribution data being obtained at a preceding time t−1, the selected piece of observation data being the image-feature-quantity extracted image obtained from the moving images obtained by a camera among the plurality of cameras at said time t;
obtaining, with a processor, likelihood data based on the observation data selected by the step of selecting the piece of observation data and predicted probability distribution data regarding the state of the target object, the predicted probability distribution data being obtained by performing prediction processing using the posterior probability distribution data;
estimating posterior probability distribution data representing a state of the observable event based on the predicted probability distribution data obtained by the step of obtaining the likelihood data and the likelihood data;
outputting prior probability distribution data based on the posterior probability distribution data estimated by the step of estimating the posterior probability distribution data as prior probability distribution data at a next time t+1; and
estimating the state of the target object in the moving images of the observable event based on the posterior probability distribution data estimated by the step of estimating posterior probability distribution data.

9. A state estimation method for estimating a state of a target object in moving images of an observable event, the state estimation method comprising:
obtaining, at predetermined time intervals, a plurality of pieces of observation data obtained from the observable event, each of which is one of a plurality of image-feature-quantity extracted images obtained by extracting image feature quantity for the target object from one of a plurality of moving images obtained by a plurality of cameras at a time t;
obtaining predicted probability distribution data regarding the state of the target object, the predicted probability distribution data being obtained by performing prediction processing using the posterior probability distribution data obtained at the preceding time t−1 and calculating, with a processor, likelihood data independently for each of the plurality of pieces of observation data that the observation obtaining circuitry obtains at said time truing the predicted probability distribution data, the plurality of pieces of observation data each being the image-feature-quantity extracted image obtained from the moving images obtained by a camera among the plurality of cameras at said time t;
deriving a piece of likelihood data based on the plurality of pieces of likelihood data calculated, for each of the plurality of pieces of observation data, by the step of calculating the likelihood data and obtaining the derived likelihood data as determined likelihood data;
estimating posterior probability distribution data representing a state of the observable event based on the predicted probability distribution data and the determined likelihood data;
outputting prior probability distribution data based on the posterior probability distribution data estimated by the step of estimating the posterior probability distribution data as prior probability distribution data at a next time t+1; and
estimating the state of the target object in the moving images of the observable event based on the posterior probability distribution data estimated by the step of estimating posterior probability distribution data.

10. An integrated circuit used in a state estimation apparatus for estimating a state of a target object in moving images of an observable event, the state estimation apparatus comprising observation obtaining circuitry configured to obtain, at predetermined time intervals, a plurality of pieces of observation data obtained from the observable event, each of which is one of a plurality of image-feature-quantity extracted images obtained by extracting image feature quantity for the target object from one of a plurality of moving images obtained by a plurality of cameras at a time t, the integrated circuit comprising:
an observation selecting circuit configured to select a piece of observation data from the plurality of pieces of observation data, the observation data being obtained at said time t by the observation obtaining circuitry, based on posterior probability distribution data regarding the state of the target object, the posterior probability distribution data being obtained at a preceding time t−1, the selected piece of observation data being the image-feature-quantity extracted image obtained from the moving images obtained by a camera among the plurality of cameras at said time t:
a likelihood obtaining circuit configured to obtain likelihood data based on the observation data selected by the observation selecting circuit and predicted probability distribution data regarding the state of the target object, the predicted probability distribution data being obtained by performing prediction processing using the posterior probability distribution data;
a posterior probability distribution estimation circuit configured to estimate posterior probability distribution data representing a state of the observable event based on the predicted probability distribution data obtained by the likelihood obtaining circuit and the likelihood data; and a prior probability distribution output circuit configured to output prior probability distribution data based on the posterior probability distribution data estimated by the posterior probability distribution estimation circuit as prior probability distribution data at a next time t+1; and circuitry configured to estimate the state of the target object in the moving images of the observable event based on the posterior probability distribution data estimated by the posterior probability distribution estimation circuitry.

11. An integrated circuit used in a state estimation apparatus for estimating a state of a target object in moving images of an observable event, the state estimation apparatus comprising observation obtaining circuitry configured to obtain, at predetermined time intervals, a plurality of pieces of observation data obtained from the observable event, each of Which is one of a plurality of image-feature-quantity extracted images obtained by extracting image feature quantity for the target object from one of a plurality of moving images obtained by a plurality of cameras at a time t, the integrated circuit comprising:

a likelihood calculation circuit configured to obtain predicted probability distribution data regarding the state of the target object, the predicted probability distribution data being obtained by performing prediction processing using the posterior probability distribution data obtained at the preceding time t−1 and to calculate, using the predicted probability distribution data, likelihood data independently for each of the plurality of pieces of observation data that the observation obtaining circuitry obtains at said time t, the plurality of pieces of observation data each being the image-feature-quantity extracted image obtained from the moving images obtained by a camera among the plurality of cameras at said time t;

a likelihood obtaining circuit configured to derive a piece of likelihood data based on the plurality of pieces of likelihood data calculated, for each of the plurality of pieces of observation data, by the likelihood calculation circuit and obtain the derived likelihood data as determined likelihood data;

a posterior probability distribution estimation circuit configured to estimate posterior probability distribution data representing a state of the observable event based on the predicted probability distribution data and the determined likelihood data;

a prior probability distribution output circuit configured to output prior probability distribution data based on the posterior probability distribution data estimated by the posterior probability distribution estimation circuit as prior probability distribution data at a next time t+1; and a circuit configured to estimate the state of the target object in the moving images of the observable event based on the posterior probability distribution data estimated by the posterior probability distribution estimation circuit.

* * * * *